Figure 13:
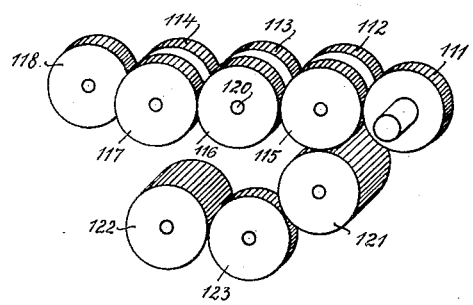

Mar. 3, 1925.
H. BUSCHBAUM
1,528,318
CARRYING MECHANISM FOR CALCULATING MACHINES
Filed March 21, 1923    22 Sheets-Sheet 1
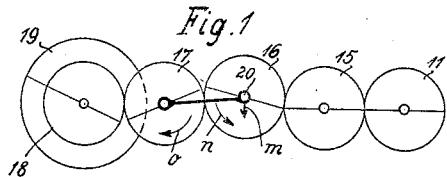
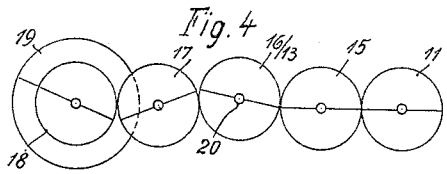
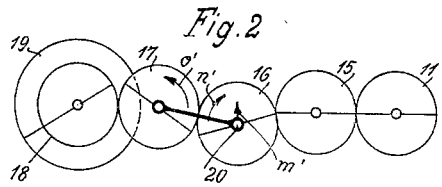
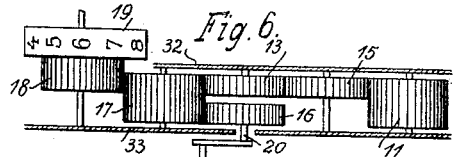
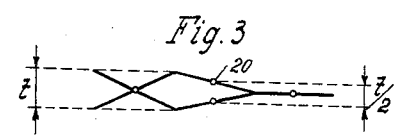
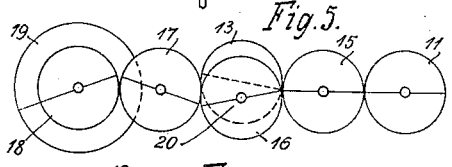
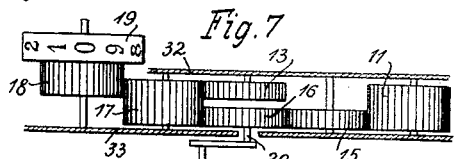
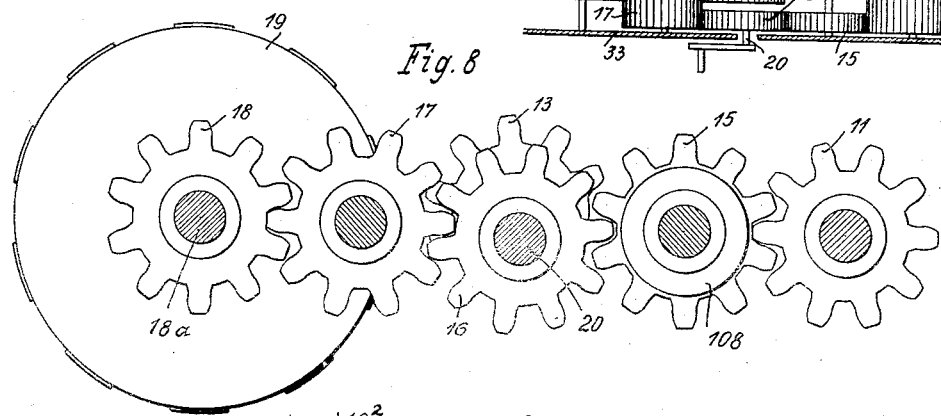
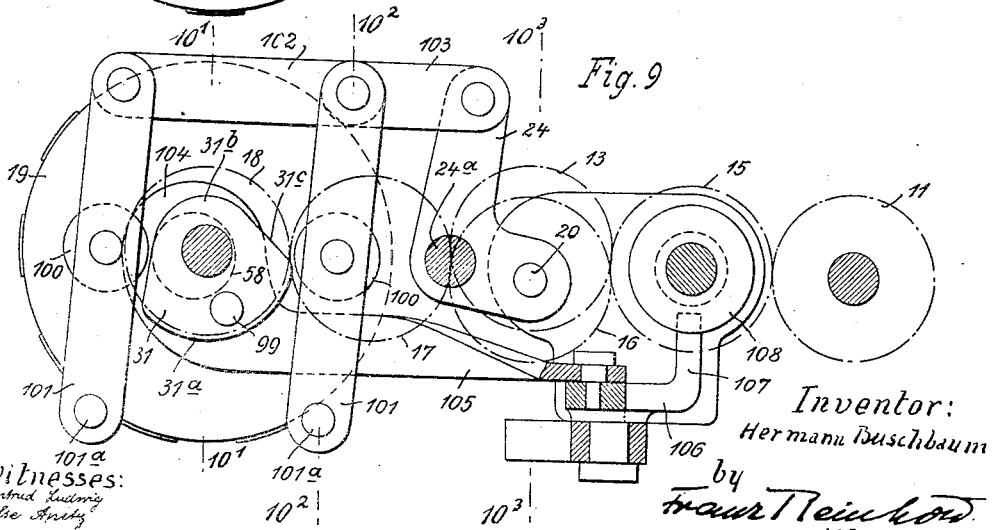
Inventor:
Hermann Buschbaum
by Franz Reichow
Attorney.

Mar. 3, 1925.
H. BUSCHBAUM
1,528,318
CARRYING MECHANISM FOR CALCULATING MACHINES
Filed March 21, 1923    22 Sheets-Sheet 2
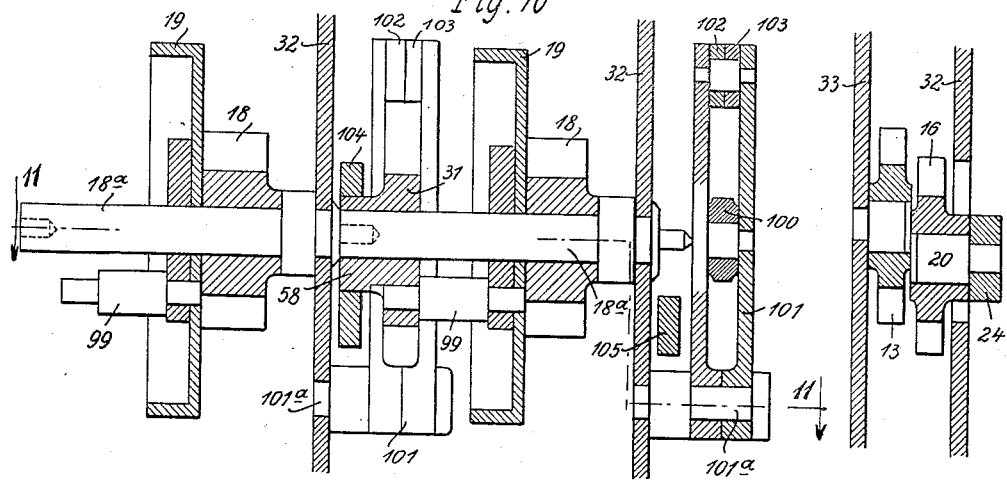
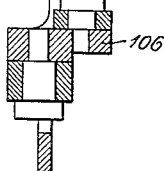
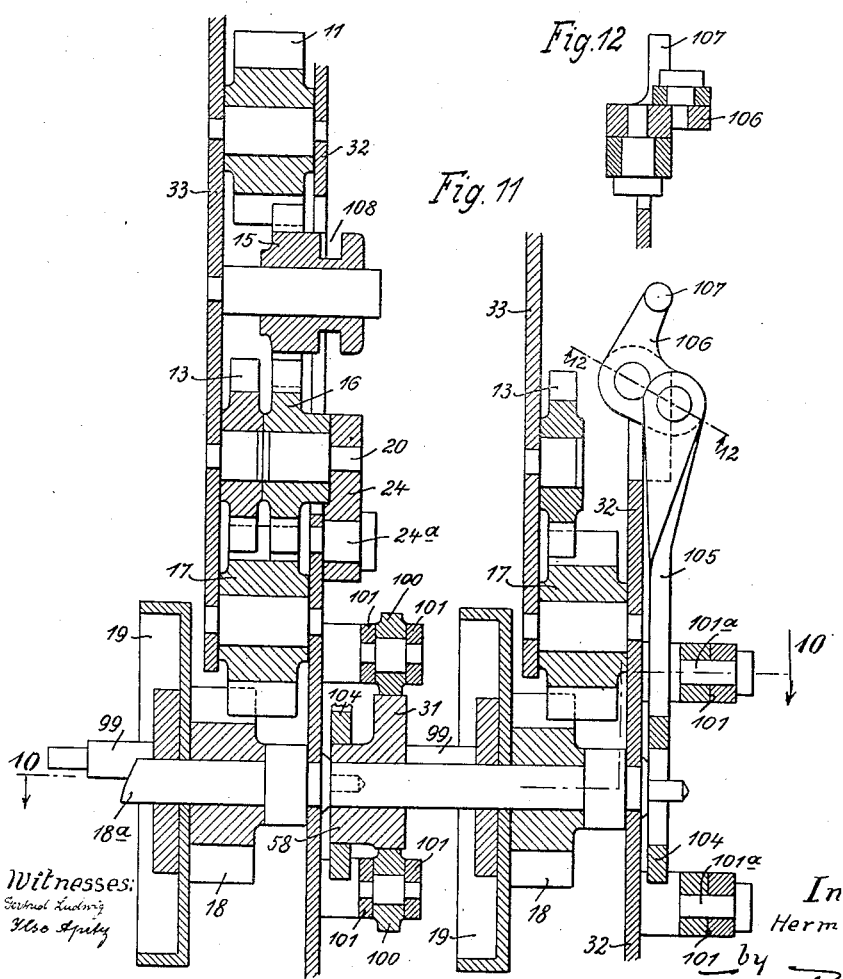
Witnesses:
Inventor:
Hermann Buschbaum
by
Attorney.

Mar. 3, 1925.  1,528,318

H. BUSCHBAUM

CARRYING MECHANISM FOR CALCULATING MACHINES

Filed March 21, 1923    22 Sheets-Sheet 3

Witnesses:

Inventor:
Hermann Buschbaum
by Franz Reinhold
Attorney.

Mar. 3, 1925.　　　　　　　　　　　　　　　　　1,528,318
H. BUSCHBAUM
CARRYING MECHANISM FOR CALCULATING MACHINES
Filed March 21, 1923　　　22 Sheets-Sheet 4
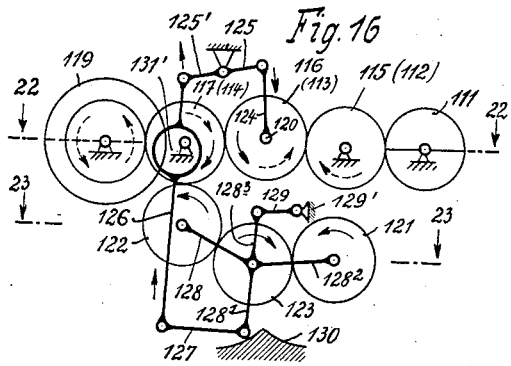
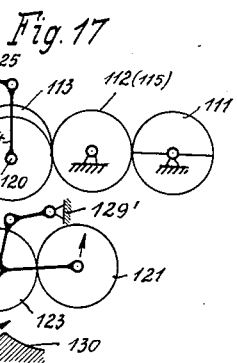
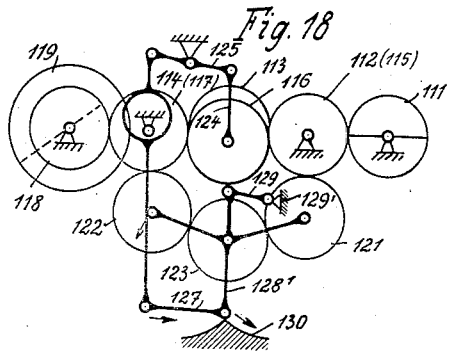
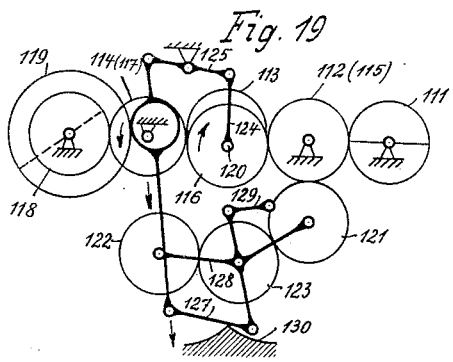
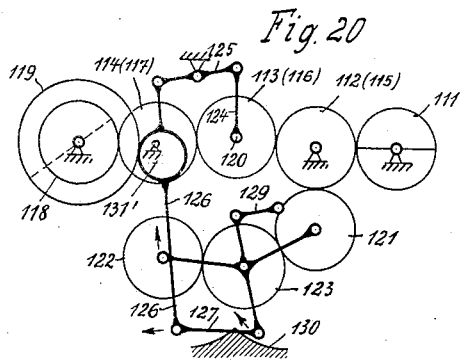
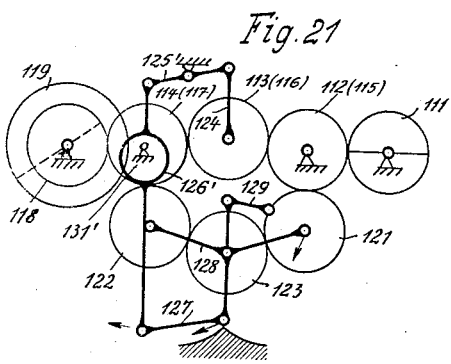
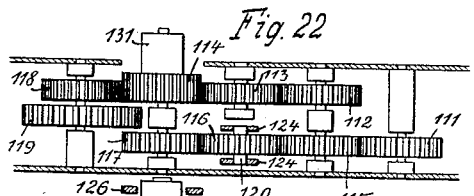
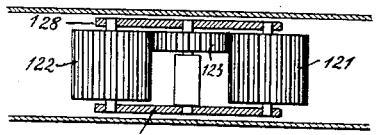
Witnesses:　　　　　　　　　　Inventor:
　　　　　　　　　　　　　　　Hermann Buschbaum
　　　　　　　　　　　　　　　Attorney.

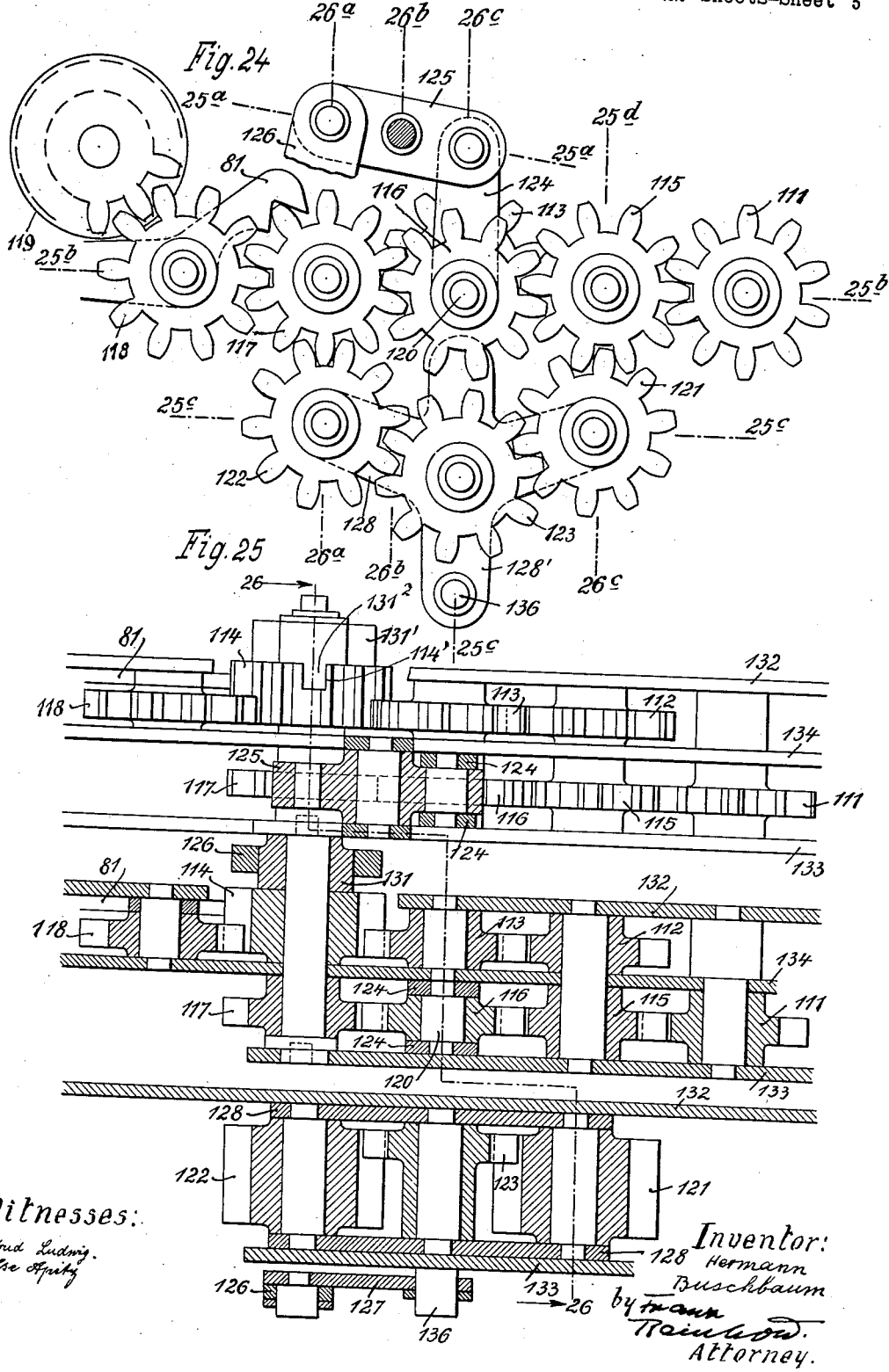

Mar. 3, 1925.
H. BUSCHBAUM
1,528,318
CARRYING MECHANISM FOR CALCULATING MACHINES
Filed March 21, 1923    22 Sheets-Sheet 6
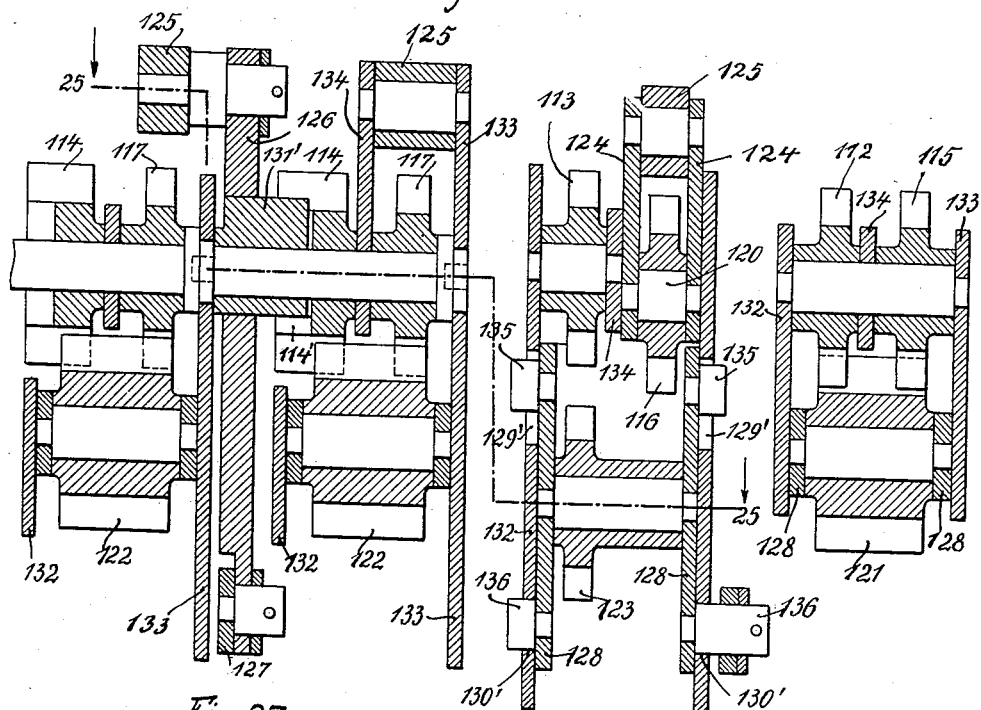
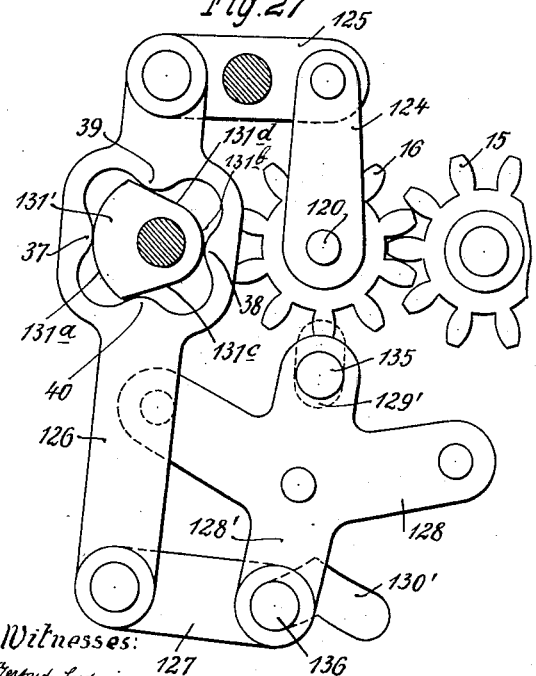
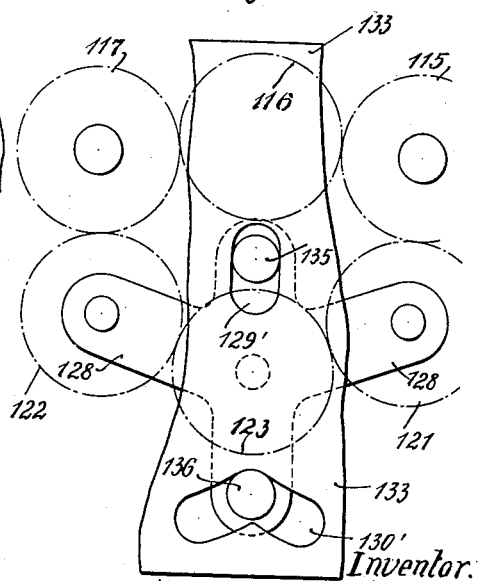

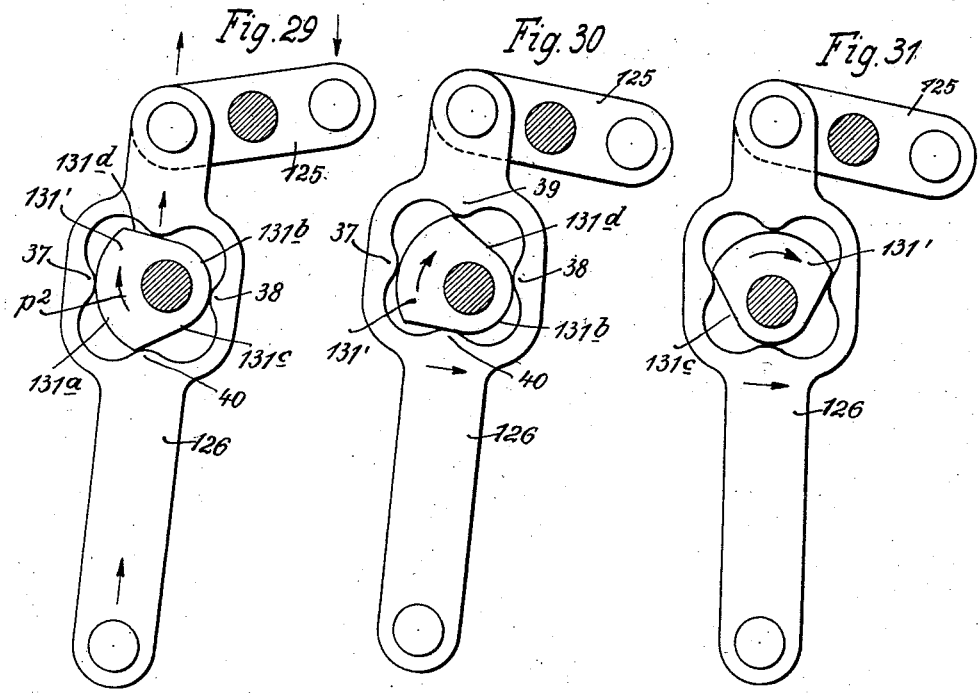

Mar. 3, 1925.
H. BUSCHBAUM
1,528,318
CARRYING MECHANISM FOR CALCULATING MACHINES
Filed March 21, 1923      22 Sheets-Sheet 8
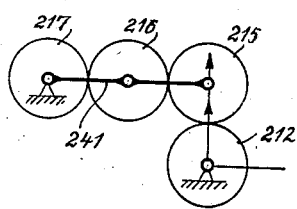
Fig. 35
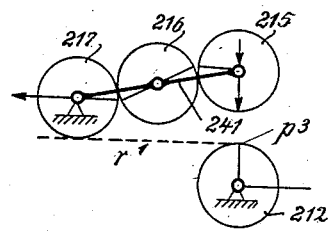
Fig. 36
Fig. 37
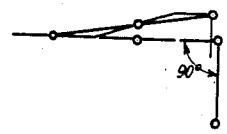
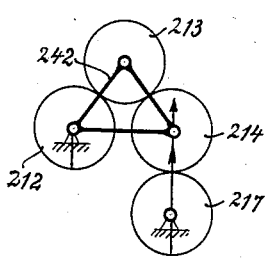
Fig. 38
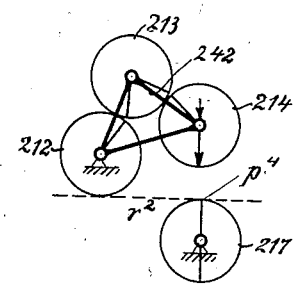
Fig. 39
Witnesses:
Inventor:
Hermann Buschbaum
by Frank Reinhow
Attorney.

Mar. 3, 1925.
H. BUSCHBAUM
1,528,318
CARRYING MECHANISM FOR CALCULATING MACHINES
Filed March 21, 1923     22 Sheets-Sheet 9
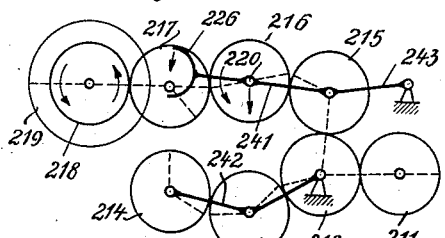
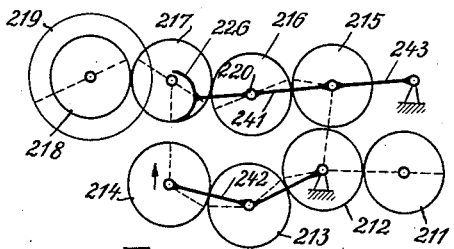
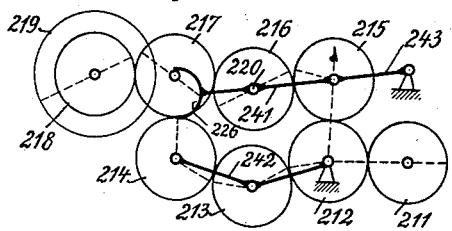
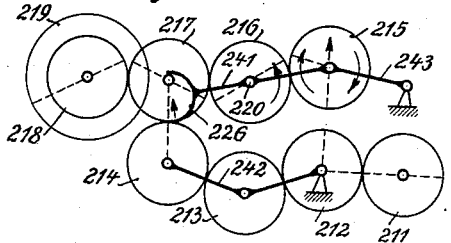
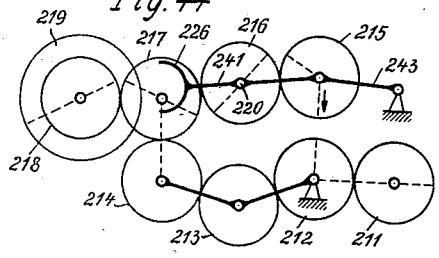
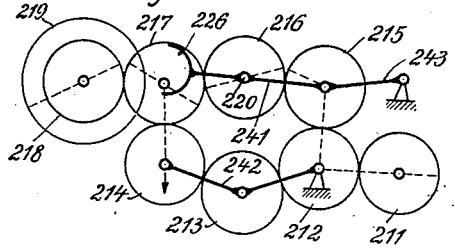
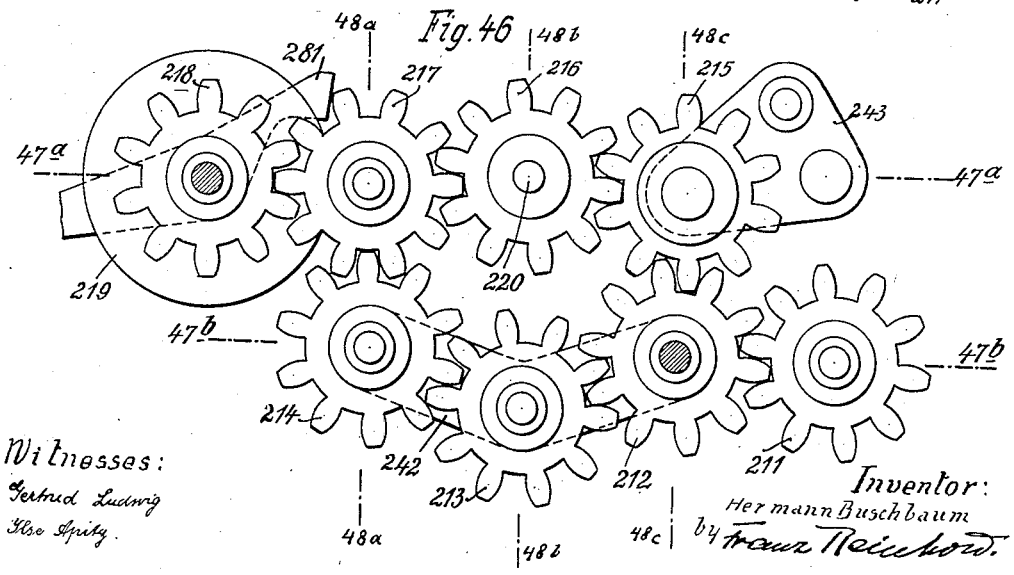
Witnesses:
Gertrud Ludwig
Ilse Spitz
Inventor:
Hermann Buschbaum
by Franz Reichow
Attorney.

Mar. 3, 1925.

H. BUSCHBAUM 1,528,318

CARRYING MECHANISM FOR CALCULATING MACHINES

Filed March 21, 1923  22 Sheets-Sheet 10

Witnesses:
Gertrud Ludwig
Ilse Apitz

Inventor:
Hermann Buschbaum
by Frank
Neuhoff
Attorney.

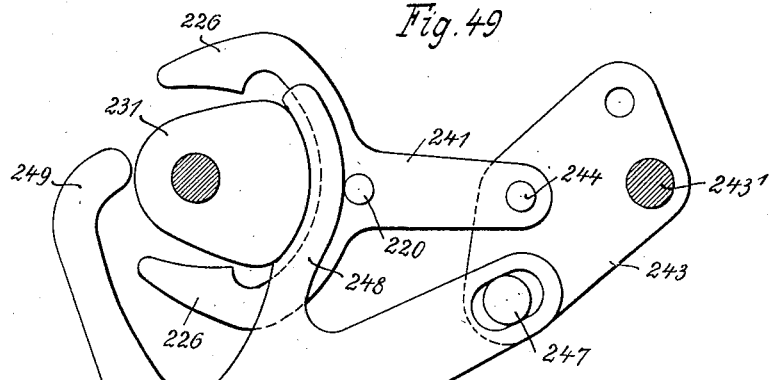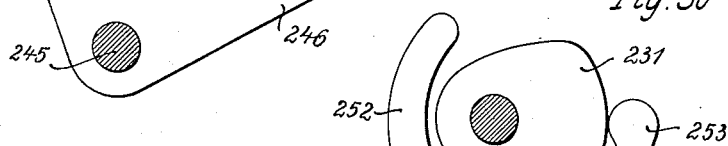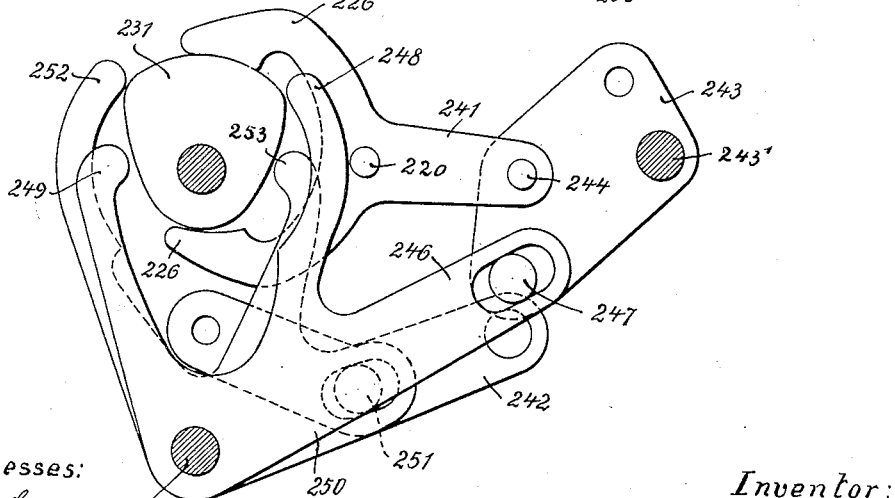

Mar. 3, 1925.                                                    1,528,318
                     H. BUSCHBAUM
        CARRYING MECHANISM FOR CALCULATING MACHINES
              Filed March 21, 1923      22 Sheets-Sheet 12
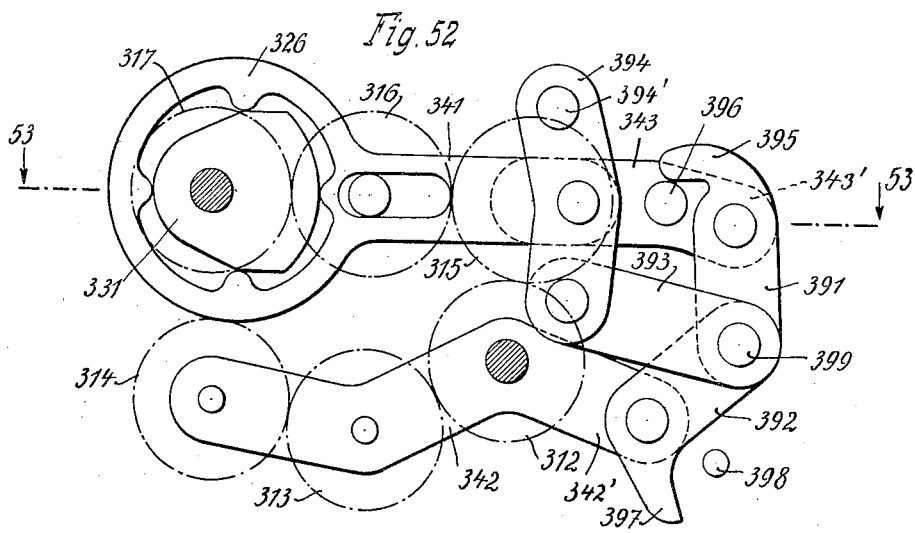
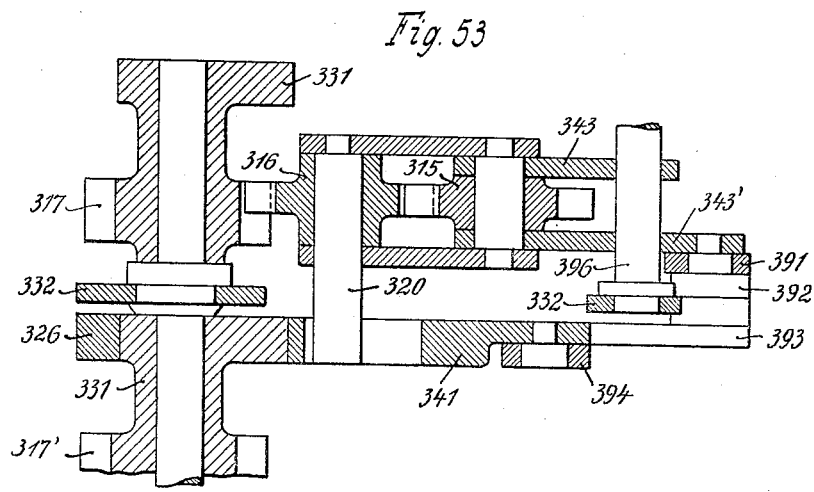
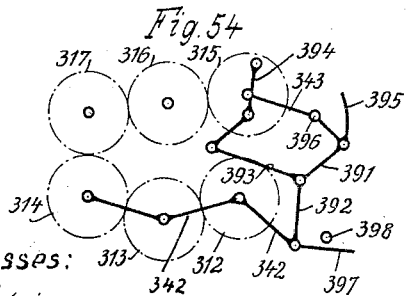
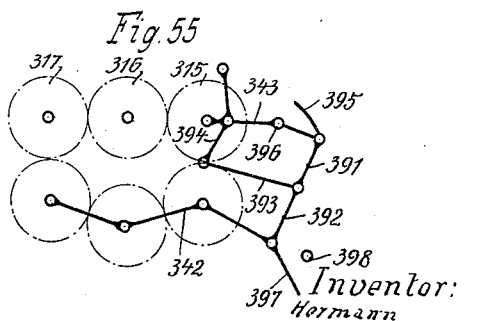

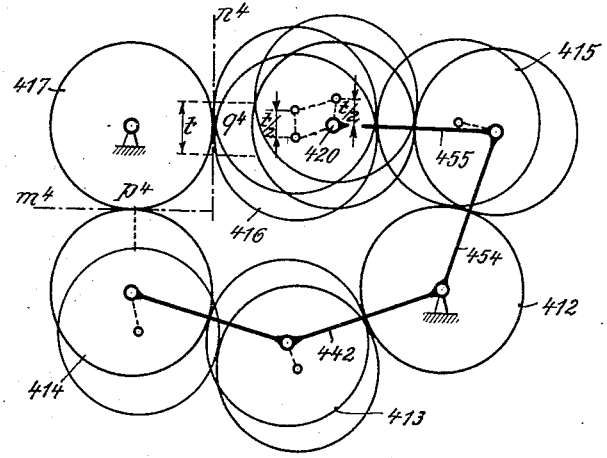
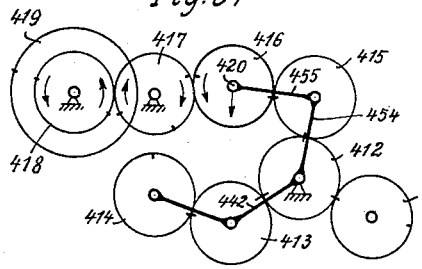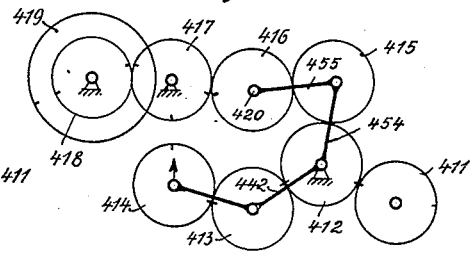
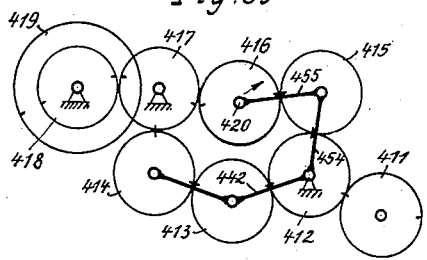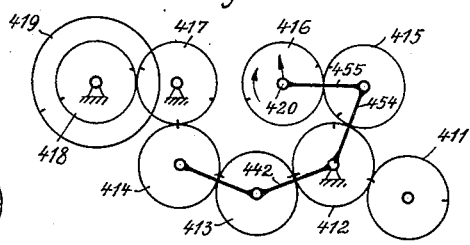
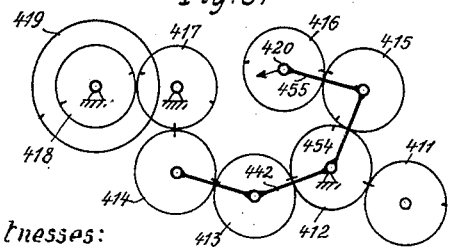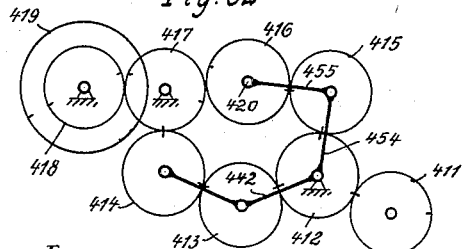

Mar. 3, 1925.
H. BUSCHBAUM
1,528,318
CARRYING MECHANISM FOR CALCULATING MACHINES
Filed March 21, 1923     22 Sheets-Sheet 14
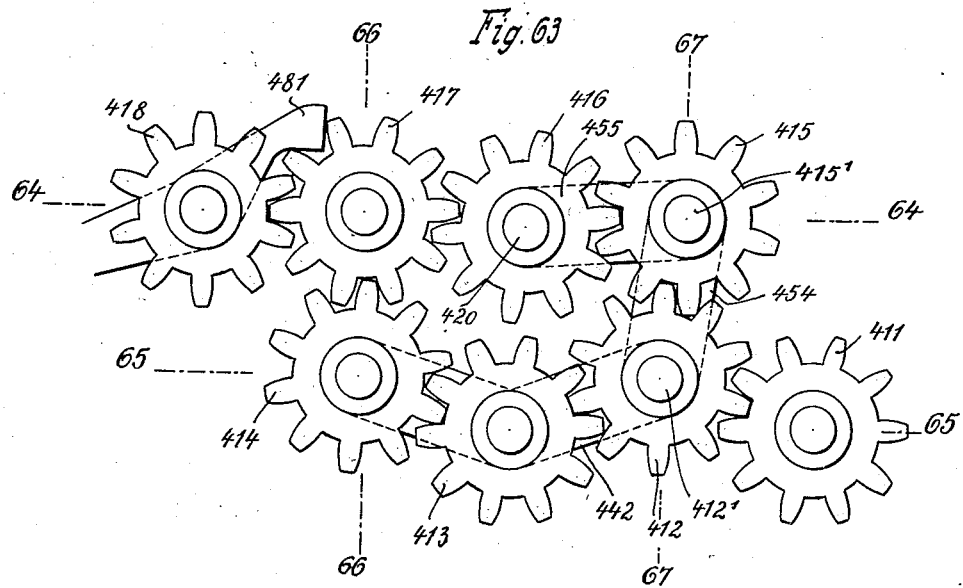
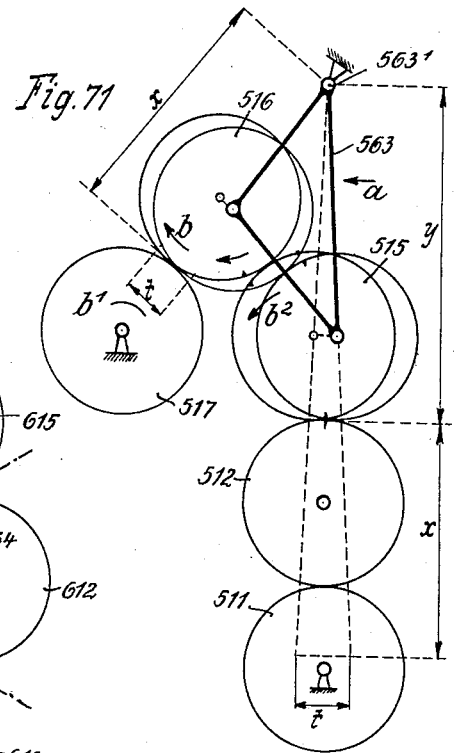
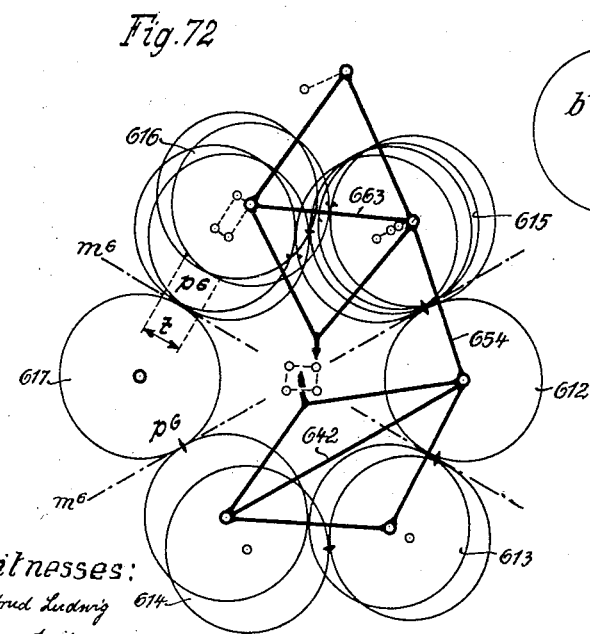
Witnesses:
Gertrud Ludwig
Else Apitz
Inventor:
Hermann Buschbaum
by Franz Reuleaux
Attorney.

Mar. 3, 1925.
H. BUSCHBAUM
1,528,318
CARRYING MECHANISM FOR CALCULATING MACHINES
Filed March 21, 1923    22 Sheets-Sheet 15
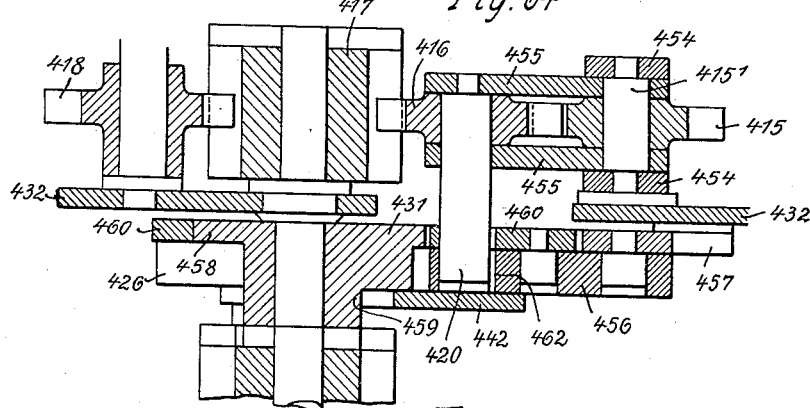
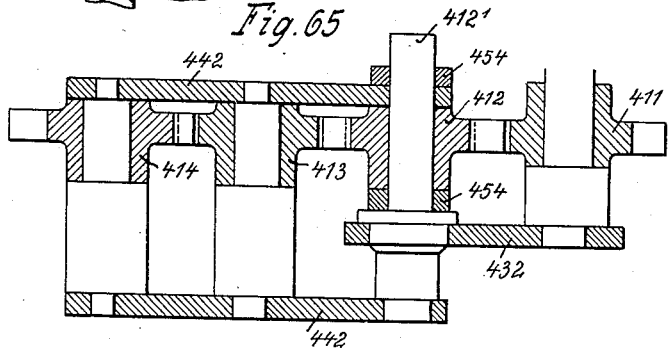
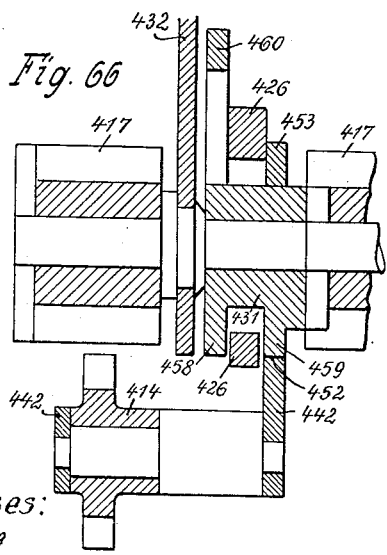
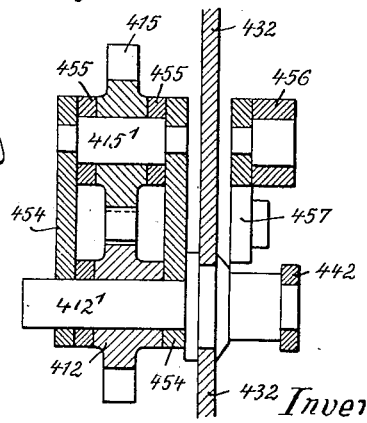
Inventor:
Hermann Buschbaum
by
Franz Reichow.
Attorney.

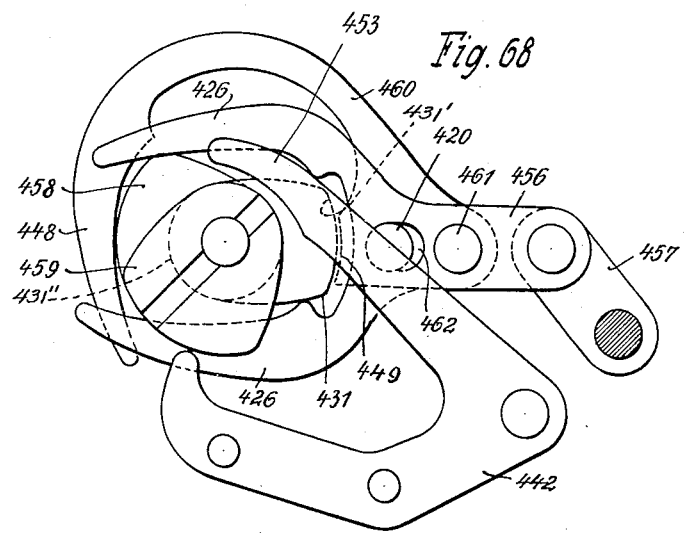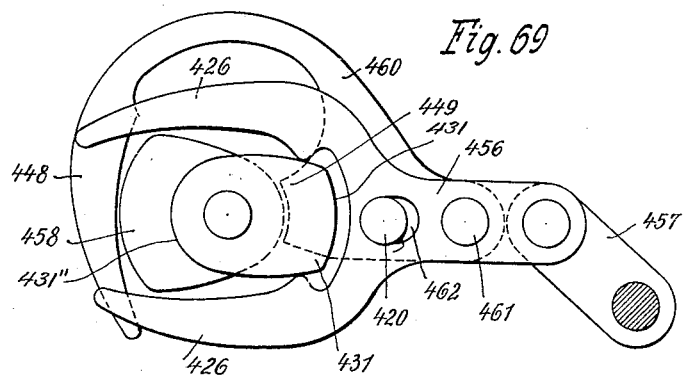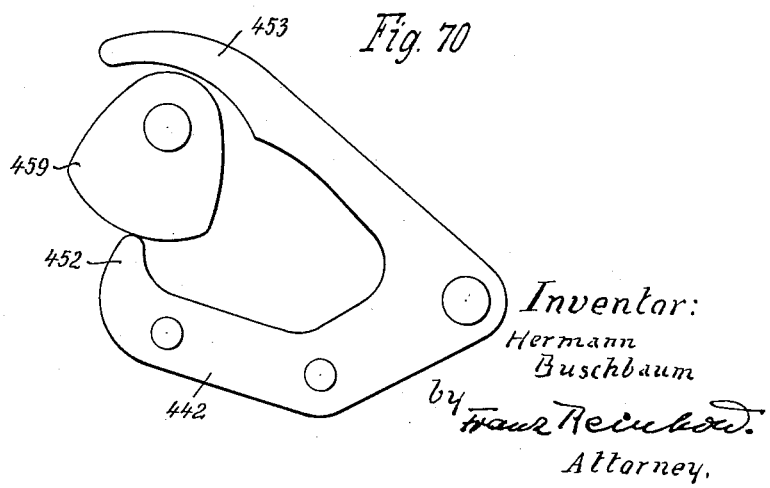

Mar. 3, 1925.                                               1,528,318
H. BUSCHBAUM
CARRYING MECHANISM FOR CALCULATING MACHINES
Filed March 21, 1923    22 Sheets-Sheet 17
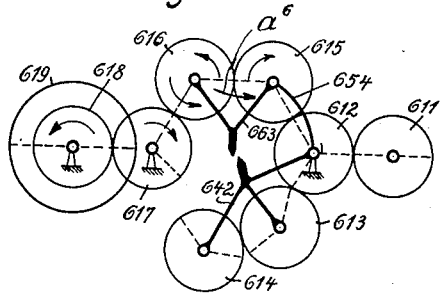
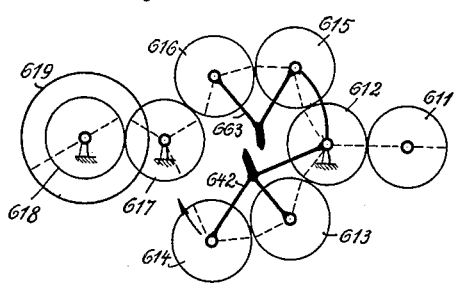
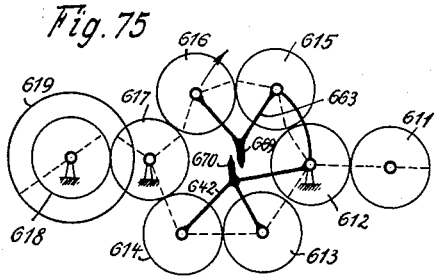
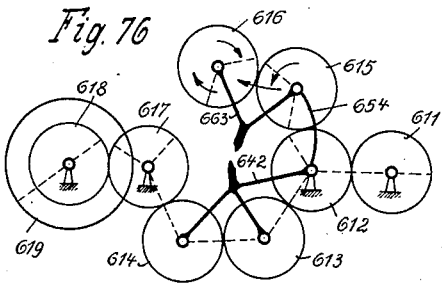
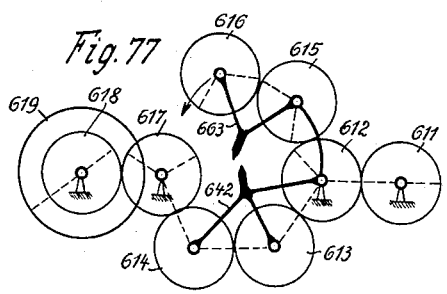
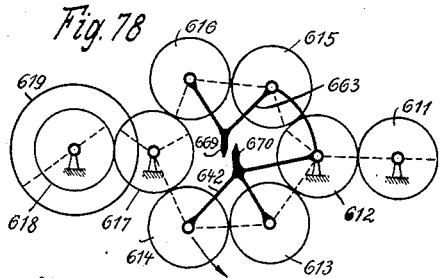
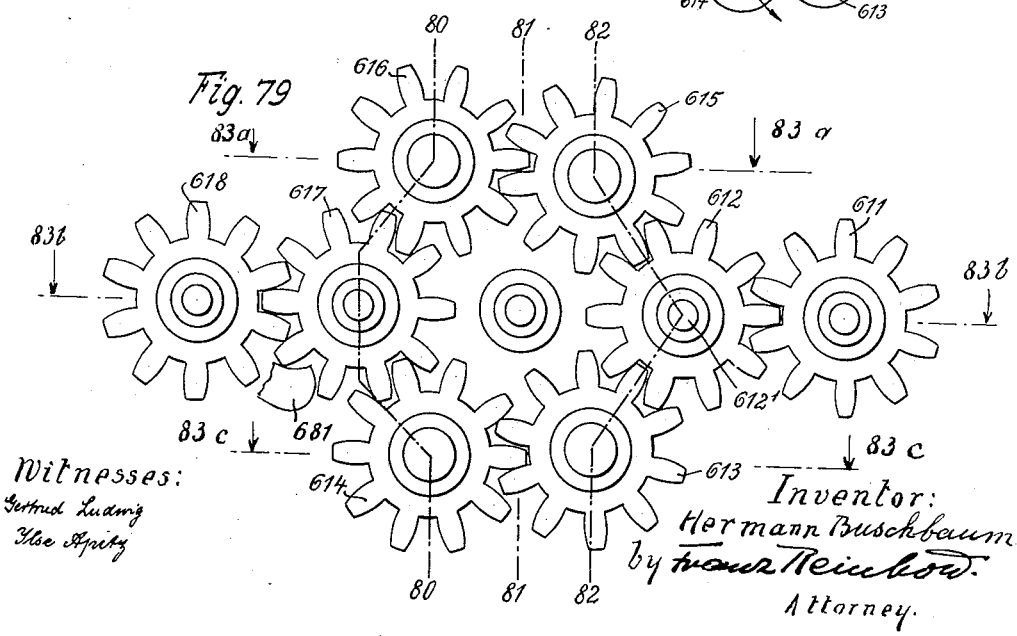

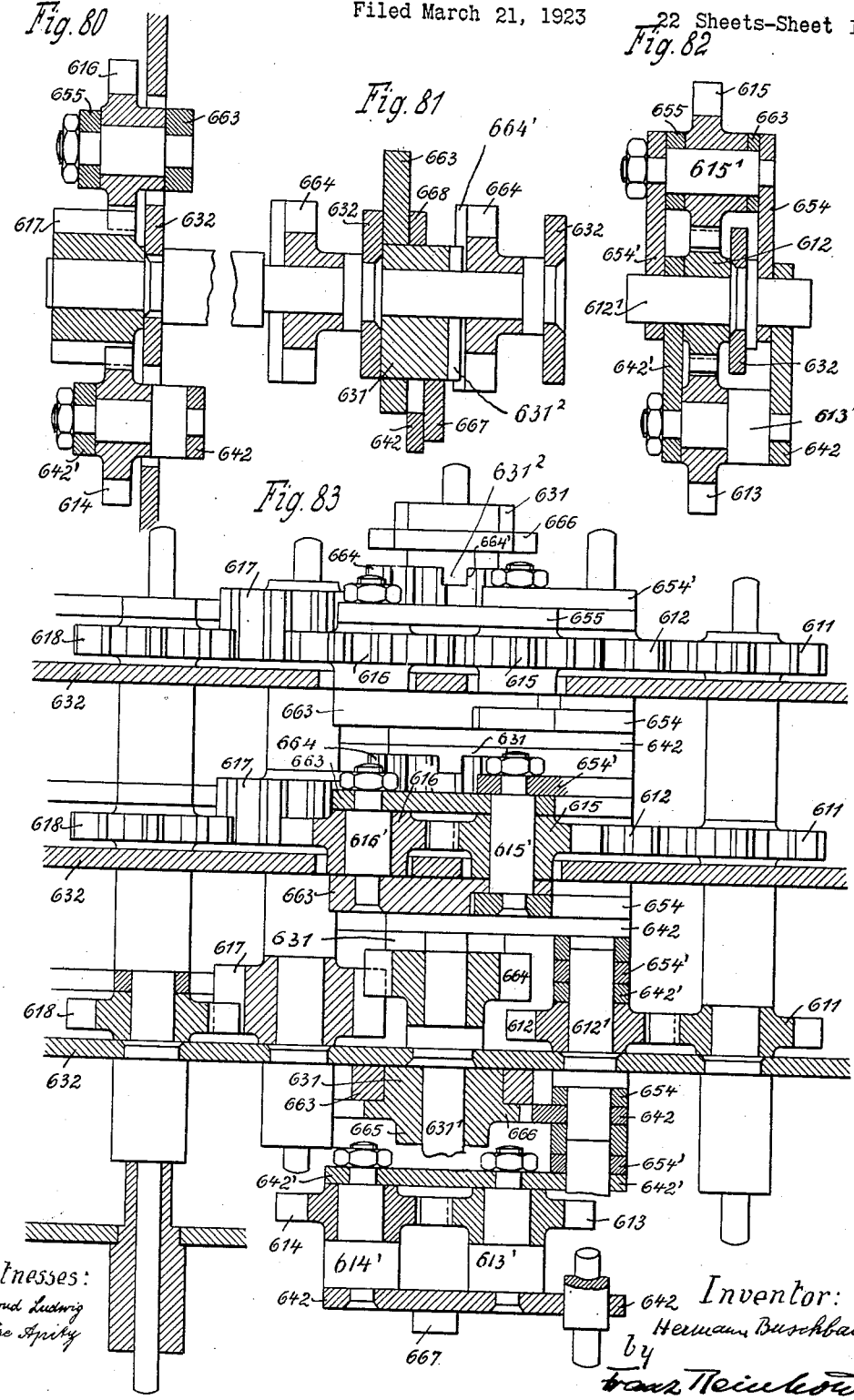

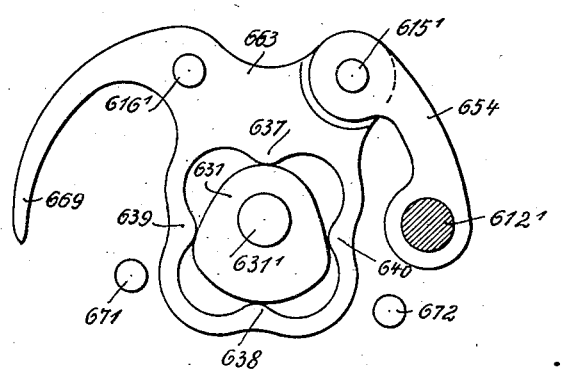
Fig. 84
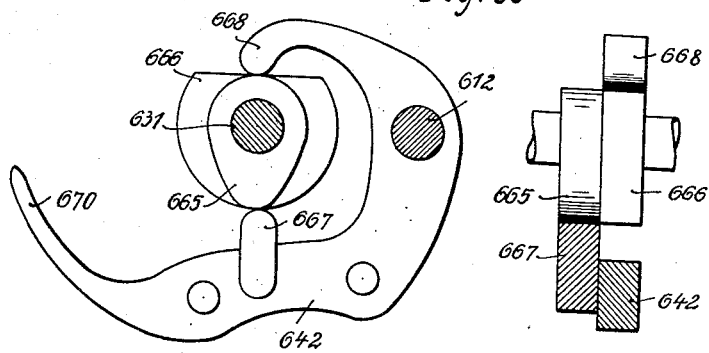
Fig. 85
Fig. 86

Mar. 3. 1925.
H. BUSCHBAUM
1,528,318
CARRYING MECHANISM FOR CALCULATING MACHINES
Filed March 21, 1923   22 Sheets-Sheet 20
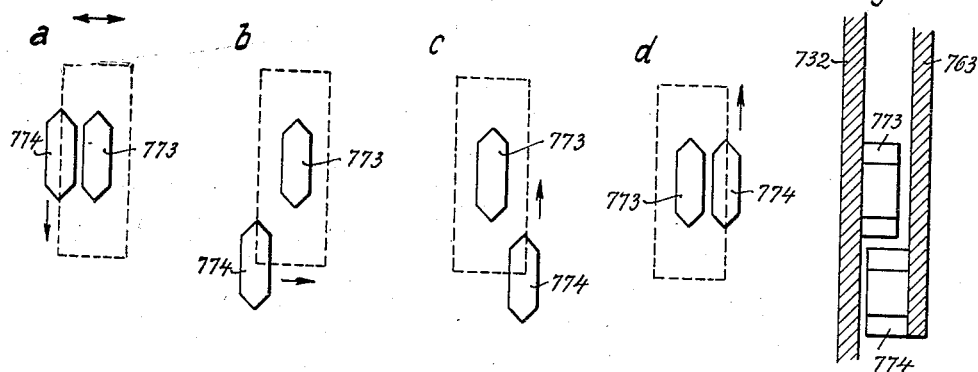
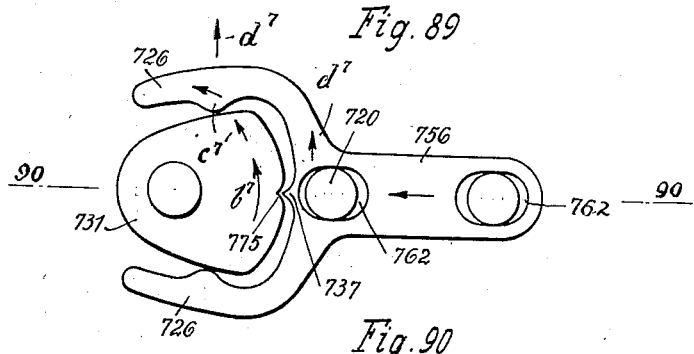
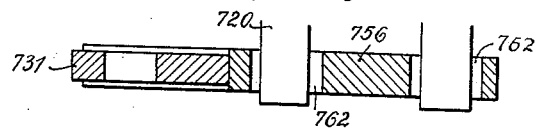
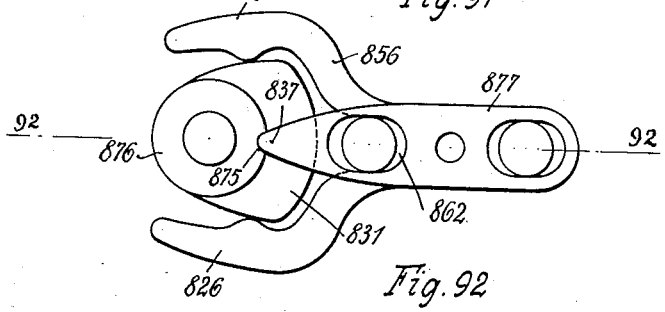
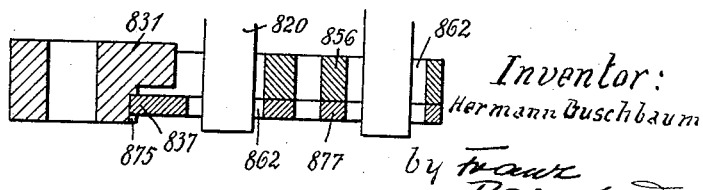
Witnesses:
Gertrud Ludwig
Ilse Apitz
Inventor:
Hermann Buschbaum
by Frank Neuhow
Attorney.

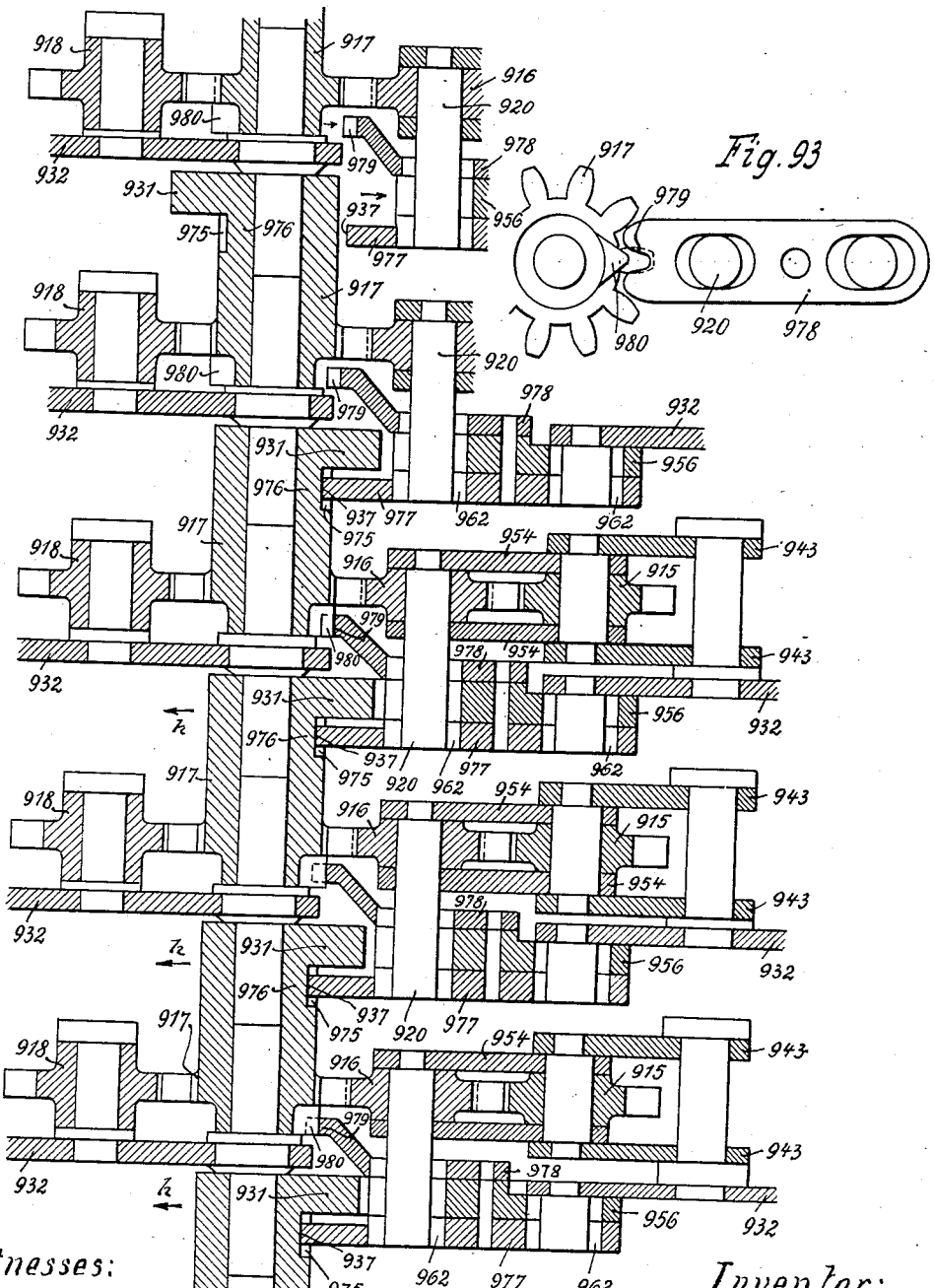

Mar. 3. 1925.  H. BUSCHBAUM  1,528,318

CARRYING MECHANISM FOR CALCULATING MACHINES

Filed March 21, 1923    22 Sheets-Sheet 22

Witnesses:
Gertrud Ludwig
Ilse Apitz

Inventor:
Hermann Buschbaum
by
Frank Reichwold
Attorney.

Patented Mar. 3, 1925.

1,528,318

UNITED STATES PATENT OFFICE.

HERMANN BUSCHBAUM, OF BERLIN-NEUTEMPELHOF, GERMANY.

CARRYING MECHANISM FOR CALCULATING MACHINES.

Application filed March 21, 1923. Serial No. 626,638.

*To all whom it may concern:*

Be it known that I, HERMANN BUSCHBAUM, a citizen of Germany, residing at Berlin-Neutempelhof, in the State of Prussia, Germany, have invented certain new and useful Improvements in Carrying Mechanisms for Calculating Machines; and I do hereby declare the following to be a full, clear, and exact description of the invention, such as will enable others skilled in the art to which it appertains to make and use the same.

My invention relates to improvements in carrying mechanisms for calculating machines, and more particularly in mechanisms of the type in which the tens are carried to the numeral wheels while the main calculating operation is performed. One of the objects of the improvements is to provide carrying mechanism of this type which is simple in construction and reliable in operation. With this object in view the operating mechanism includes a member which, in addition to the movement for transmitting the values from 1 to 9, is capable of a reciprocating carrying movement adapted to be performed while the said values are transmitted. Another object of the improvements is to provide mechanism in which within the short interval of time in which a numeral wheel passes from the "nine" position to the "zero" position, or vice versa, carrying is effected smoothly and without shocks. With this object in view my invention consists in including means in the carrying mechanism whereby the uniform and high velocity of the numeral wheel or the mechanism connected therewith is transmitted to the adjacent numeral wheel so as to gradually accelerate and retard the same. One way of carrying out the invention consists in connecting the numeral wheels with cams of suitable form each of which transmits the rotary movement of one numeral wheel into a reciprocating movement of the operating mechanism of the adjacent numeral wheel for adding to the rotary movement thereof an additional or carrying movement.

In order that my invention be more clearly understood several examples embodying the same have been shown in the accompanying drawings, in which the same reference characters have been used in all the views to indicate corresponding parts. In said drawings, Figs. 1 and 2, are diagrams showing a train of gear wheels of a registering mechanism and illustrating the manner of performing a carrying operation by tangentially moving one of the gear wheels, the figures showing the said carrying gear wheel in different positions, Fig. 3, is a diagram illustrating the stroke of the carrying gear wheel required for advancing the numeral wheel one value, Figs. 4 and 5, are diagrams similar to those shown in Figs. 1 and 2 and showing in addition a gear wheel adapted to form together with some of the gear wheels shown in Figs. 1 and 2 a second train of gear wheels for transmitting registering movement to the numeral wheel, Figs. 6 and 7, are diagrammatical plan views of Figs. 4 and 5 and each showing one of the trains of gear wheels in operative position.

Figure 14:
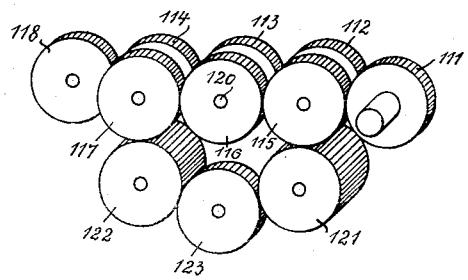
Figure 15:
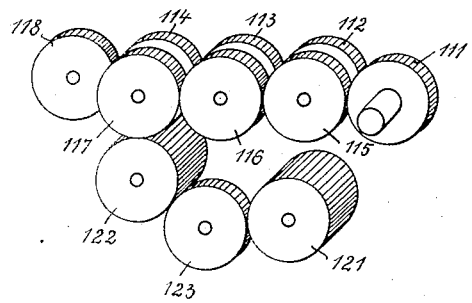

Fig. 8, is an elevation of the gear wheels and the numeral wheel of a registering mechanism constructed according to the diagrams shown in Figs. 4 to 7, Fig. 9, is an elevation of the registering mechanism showing the cams and levers for transmitting a carrying operation from the registering mechanism of lower order, the gear wheels of the registering mechanism of higher order being shown in dotted lines, Fig. 10, is a vertical section of several registering mechanisms taken longitudinally of the machine and on the line 10—10 of Fig. 11, and on the lines $10^1$—$10^1$, $10^2$—$10^2$, and $10^3$—$10^3$, of Fig. 9, Fig. 11, is a sectional plan view of the registering mechanisms shown in Fig. 10, some of the parts being omitted in different mechanisms for more clearly showing other parts, the section being taken on the line 11—11 of Fig. 10, Fig. 12, is a sectional detail view taken on the line 12—12 of Fig. 11, Figs. 13 to 15, are diagrammatical perspective views showing a modification in which the trains of gear wheels are rocked radially for being alternately thrown into operative positions, Figs. 16 to 21, are diagrammatical elevations of the mechanism shown in Figs. 13 to 15 and illustrating the gearing for transmitting the carrying operation from a registering mechanism of lower order to a registering mechanism of higher order, the figures showing the parts in the successive positions.

Figs. 22 and 23, are plan views taken respectively on the lines 22 and 23 of Fig. 16, Fig. 24, is an elevation showing the trains of gear wheels and the operating mechanism thereof, Fig. 25, is a plan view partly in section taken on the line 25—25 of Fig. 26 and 25$^a$—25$^a$, 25$^b$—25$^b$, 25$^c$—25$^c$, and 25$^d$—25$^d$ of Fig. 24.

Figure 47:
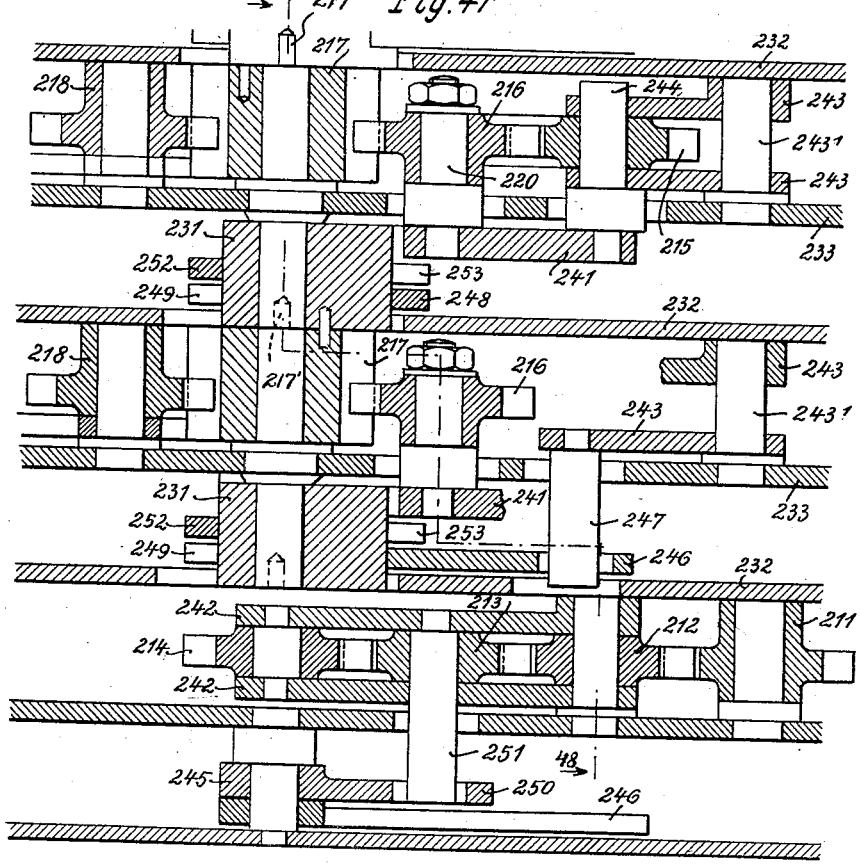
Figure 48:
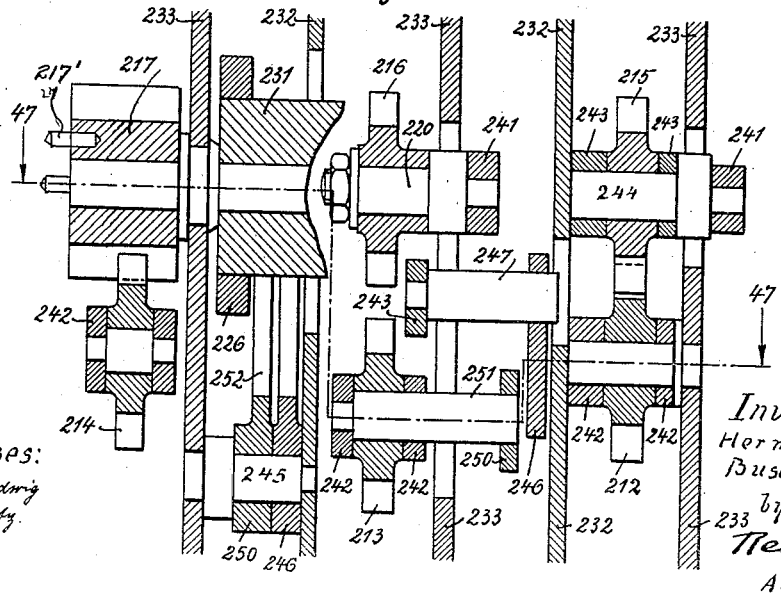

Fig. 26, is a vertical section taken on the line 26—26 of Fig. 25, or on the lines 26$^a$—26$^a$, 26$^b$—26$^b$, and 26$^c$—26$^c$ of Fig. 24, Fig. 27, is a detail view showing the operating mechanism for setting the gear wheels performing a carrying operation, Fig. 28, is a detail view showing the trains of gear wheels in another position, Figs. 29 to 34, are detail views showing the operating mechanism for the trains of gear wheels in different positions, Figs. 35 to 39, are diagrams illustrating the principle of the operation of the trains of gear wheels, Figs. 40 to 45, are diagrammatical views showing the trains of gear wheels arranged according to Figs. 35 to 37 in different positions, Fig. 46, is an elevation showing the gear wheels constructed according to the diagrams shown in Figs. 35 to 37 and 40 to 45, Fig. 47, is a horizontal section of the mechanism taken on the lines 47$^a$—47$^a$ and 47$^b$—47$^b$ of Fig. 46 and 47—47 of Fig. 48, Fig. 48, is a vertical section taken on the line 48—48 of Fig. 47 and on the lines 48$^a$—48$^a$, 48$^b$—48$^b$, and 48$^c$—48$^c$ of Fig. 46.

Figure 95:
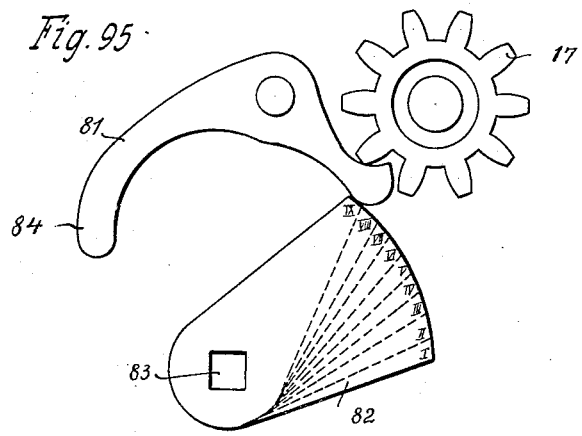
Figure 96:
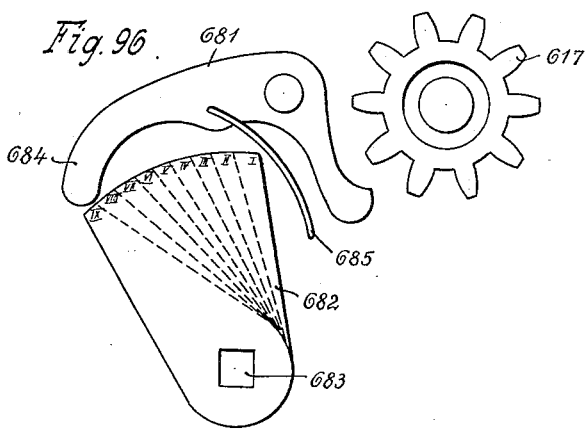
Figure 97:
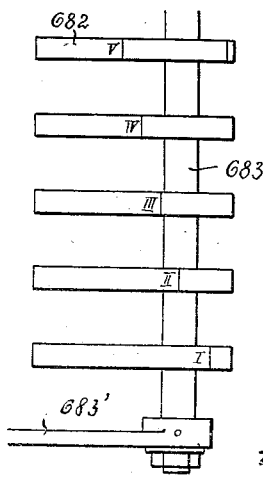

Figs. 49 to 51, are detail views of the gear wheel operating mechanism provided in the mechanism shown in Figs. 46 to 48, Fig. 49 showing the parts controlling the upper train of gear wheels and the carrying movement thereof, Fig. 50, showing the parts operating the lower train of gear wheels, and Fig. 51 showing all the parts combined, Fig. 52, is an elevation showing a modification of the mechanism controlling the trains of gear wheels, Fig. 53, is a horizontal section taken on the line 53—53 of Fig. 52, Figs. 54 and 55, are diagrams illustrating the operation of the mechanism shown in Figs. 52 and 53, Fig. 56, is a diagrammatical view illustrating a modification of the mechanism for setting the trains of gear wheels, Figs. 57 to 62, are diagrams showing the mechanism corresponding to Fig. 56 in different positions, Fig. 63, is an elevation of the trains of gear wheels of the mechanism shown diagrammatically in Figs. 56 to 62, Figs. 64 and 65, are horizontal sections taken respectively on the lines 64—64 and 65—65 of Fig. 63, Figs. 66 and 67, are vertical sections taken respectively on the lines 66—66 and 67—67 of Fig. 63, Figs. 68 to 70, are detail views showing the mechanism for operating the trains of gear wheels of the mechanism shown in Figs. 56 to 67, Figs. 71 and 72, are diagrams illustrating the principle of the operation of the trains of gear wheels embodied in the modification shown in Figs. 73 to 83, Figs. 73 to 78, are diagrams showing the operation of the trains of gear wheels of a modified construction, Fig. 79, is an elevation of the trains of gear wheels shown diagrammatically in Figs. 73 to 78, Figs. 80 to 82, are cross-sections taken respectively on the lines 80—80, 81—81, and 82—82 of Fig. 79, Fig. 83, is a plan view partly in section taken on the lines 83$^a$—83$^a$, 83$^b$—83$^b$, and 83$^c$—83$^c$ of Fig. 79, Fig. 84, is a detail view showing the mechanism for operating the upper train of gear wheels, Fig. 85, is a similar detail view showing the mechanism for operating the lower train of gear wheels, Fig. 86, is a diagrammatical view showing the successive positions of the guide members for insuring exact carrying operation, Fig. 87, is a diagrammatical view showing a modification of the guide members, Fig. 88 is an elevation looking from the right in Fig. 87, Fig. 89, is a detail view showing a modification of the mechanism operating the gear wheels of the registering mechanism, Fig. 90, is a horizontal section taken on the line 90—90 of Fig. 89, Fig. 91, is an elevation showing another modification of the mechanism operating the said gear wheels, Fig. 92, is a horizontal section taken on the line 92—92 of Fig. 91, Fig. 93, is a detail view showing means for directly coupling the carrying gear wheels of a registering mechanism with the operating member controlled by the registering mechanism of lower order, Fig. 94, is a plan view partly in section showing the means illustrated in Fig. 93 embodied in a calculating machine, Fig. 95, is a detail view showing adjusting means for the registering mechanism, Fig. 96, is a similar view showing a modification, and Fig. 97, is a plan view of Fig. 96.

In the above description of Figs. 10, 25, 26, 47, 48 and 83, the section lines 10$^1$—10$^1$ to 10$^3$—10$^3$, 25$^a$—25$^a$ to 25$^d$—25$^d$, 26$^a$—26$^a$ to 26ᶜ—26ᶜ, 47ᵃ—47ᵃ and 47ᵇ—47ᵇ, 48ᵃ—48ᵃ to 48ᶜ—48ᶜ, and 83ᵃ—83ᵃ to 83ᶜ—83ᶜ are understood to represent planes passed through similar mechanisms located one behind the other in the figures showing the section lines.

Before describing the invention in detail I shall explain the principle thereof with reference to the diagrams shown in Figs. 1 to 3. As shown in the said figures, the operating mechanism of each numeral wheel comprises a gear wheel 11 from which the values of the calculation are transmitted to a numeral wheel 19 connected with a gear wheel 18, and a set of transmission gear wheels 15, 16, 17. The said gear wheels have the function to transmit the values set in the registering mechanism of each order, and in addition in the carrying operation, to transmit one unit taken from the adjacent numeral wheel of the lower order passing from the "9" position to the "0" position. In the example shown in the said figures the additional or carrying movement is brought about by transversely shifting the axis 20 of the gear wheel 16 in the direction of the arrow m, as is indicated in a diagrammatical way in Figs. 1 and 2. In the position shown in Fig. 1 the gear wheel 16 is in its uppermost position. By shifting the same downwardly and into the position shown in Fig. 2, the gear wheel is rotated by its engagement with the gear wheel 15 and such rotary movement is transmitted to the gear wheel 17. The direction of the rotation of the gear wheels 16 and 17 has been indicated in Fig. 1 by the arrows n and o, and the consecutive positions of the wheels have been indicated in Figs. 1 and 2 by corresponding diameters. In a similar way, when shifting the gear wheel 16 upwards and in the direction of the arrow m' the gear wheels 16 and 17 are rotated in the opposite directions indicated by the arrows n' and o'. If the distance t of two consecutive teeth corresponds to one value, the gear wheel 16 must be shifted upwards or downwards a distance equal to ½t, as will readily be understood from Fig. 3. So far I have assumed that the gear wheel 15 is stationary, but it will be understood that the result is the same if the said wheel is rotated for transmitting certain values to the numeral wheel, in which case both movements are added to each other.

It will be understood that by shifting the gear wheel 16 upwards and downwards the gear wheel 17 is rotated in one or the other direction, and one value is added to or subtracted from the numeral wheel, as is necessary according to the calculation. However, when performing the upward and downward movements in succession in one carrying operation the value which is first transmitted to the numeral wheel is thereafter reduced therefrom. Therefore the gear wheel 16 is made inoperative with reference to the numeral wheel when performing one stroke. In the preferred form of the invention a second train of gear wheels is interposed between the driving gear wheel 11 and the numeral wheel, and both trains of gear wheels are alternately operative.

In Figs. 4 to 12 I have shown a practical embodiment of the invention explained with reference to Figs. 1 to 3. As shown in addition to the gear wheels 15, 16, 17 a second train of gear wheels 15, 13, 17 is interposed between the gear wheels 11 and 18, and both trains of gear wheels are disposed beside each other. The axes of the gear wheels are mounted on plates 32 and 33. The driving gear wheel 11 and the gear wheel 17 are broad, and the gear wheel 17 is in mesh with the coaxial gear wheels 13 and 16, and the gear wheel 11 with an axially shiftable gear wheel 15 adapted for engagement with either one of the gear wheels 13 or 16. The shaft 20 of the gear wheel 16 is adapted to be rocked upwardly and downwardly for transmitting a value to the gear wheels 17 and 18 and the numeral wheel 19, as is shown in Figs. 4 and 5, Fig. 4 showing the gear wheel in the upper position and Fig. 5 in the lower one. In the said figures the movement of the gear wheels caused by the rocking movement of gear wheel 16 is indicated by corresponding diameters, the diameter of the gear wheel 13 being indicated in Fig. 5 by a dotted line.

For throwing the gear wheels 13 and 16 alternately into and out of operation the gear wheel 15 is shifted in axial direction. If the numeral wheel of lower order passes from the "9" position to the "0" position, and a value is carried over to the mechanism shown in Figs. 4 to 7, the gear wheel 15 is in engagement with the gear wheel 16, and the gear wheel 16 passes from its upper position shown in Fig. 4 into its lower position shown in Fig. 5, thus advancing the numeral wheel one step corresponding to one value. Thereafter and preferably between the "0" and "4" positions of the numeral wheel of lower order, gear wheel 15 is shifted into engagement with gear wheel 13, as is shown in Fig. 6. Between the "4" and "5" positions of the numeral wheel of lower order gear wheel 16 is lifted from the position shown in Fig. 5 into that shown in Fig. 4. However, this return movement of the gear wheel 16 does not cause rotation of gear wheel 17 and the numeral wheel 19, because gear wheel 16 is out of engagement with gear wheel 15, and the numeral wheel is connected by the gear wheels 15, 13, 17 and 18 with gear wheel 11. Therefore gear wheel 16 is idle when being returned into initial position.

Between the "5" and "9" positions of the gear wheel of lower order gear wheel 15 is again shifted into engagement with gear wheel 16, which is now ready for performing another carrying operation.

When operating the registering mechanism in the opposite direction, the operations are performed in the reverse order: The position shown in Fig. 4 corresponds to the "9" position of the numeral wheel of lower order, which is now turned backwards, and when the said numeral wheel arrives in the "5" position, gear wheel 15 has been shifted from the position shown in Fig. 7 into that shown in Fig. 6, and when the numeral wheel passes from the "5" to the "4" position the gear wheel 16 is rocked downwardly, which rocking movement has no effect on the numeral wheel 19 of higher order. Thereafter, gear wheel 15 is brought into engagement with gear wheel 16, and when passing from the "0" to the "9" position the registering mechanism of lower order rocks the gear wheel 16 upwardly and, by reason of the engagement between the gear wheels 15 and 16, shifts the numeral wheel 19 of higher order one step for subtracting one value.

For operating the carrying mechanism in the manner described various mechanisms may be provided. In Figs. 8 to 12 I have shown an example in which the gear wheel 16 is disposed by a distance corresponding to one half the distance of two consecutive teeth lower than the gear wheel 13, so that after lifting gear wheel 16 the axes of both wheels 13 and 16 are in alignment, in which case all the gear wheels are in the positions for correct engagement and gear wheel 15 can be shifted from gear wheel 13 to 16 and vice versa. The numeral wheel 19 carries a pin 99, and to its shaft $18^a$ a cam 31 and an eccentric 58 are keyed. The cam 31 is formed with two concentric portions $31^a$ and $31^b$ of different radii connected by faces $31^c$, and it is engaged by a pair of rollers 100 carried each by two rocking levers 101 connected by links 102 and 103 with a bell crank lever 24 having the axis 20 of gear wheel 16 secured thereto. The rockers 101 and the levers 24 are mounted respectively on pivot bolts $101^a$ and $24^a$ secured to the plates 32. The difference of the radii of the concentric parts $31^a$ and $31^b$ is substantially equal to the stroke of the rollers 100 required for rocking the shaft 20 a distance corresponding to one half the distance of two consecutive teeth of the gear wheel 18, and in some cases I limit the stroke of the said rollers by suitable stops (not shown). The angular position of the faces $31^c$ relatively to the axis $18^a$ is such that the shaft 20 is rocked when the numeral wheel of lower order passes from the "9" to the "0" position.

The faces $31^c$ are shaped so that they are tangential to the concentric portion $31^b$ of smaller radius, and that thereafter the movement transmitted thereby to the rollers 100 and the parts connected therewith is gradually accelerated, until the faces $31^c$ merge into the concentric portion $31^a$ of larger diameter. In both directions of the rotation of the cam the rollers 100 move from the portion $31^b$ of smaller radius to the portion $31^a$ of larger diameter, so that they are gradually accelerated. Thereby I insure a smooth carrying operation, which does not cause shocks, and which permits the transmission of the carrying operation through a large number of registering mechanisms of different order.

The eccentric 58 is rigidly connected with the cam 31, and it cooperates with an eye 104 formed on a link 105 jointed to a bell crank lever 106. An arm 107 of the bell crank lever engages in an annular groove 108 made in the hub of the gear wheel 15. Therefore the eccentric 58 is adapted to shift the gear wheel 15 axially and into position for engagement with either one of the gear wheels 13 or 16, and the angular position of the eccentric on the shaft $18^a$ is such that gear wheel 15 is in mesh with gear wheel 16 when the numeral wheel of lower order passes from the "9" position to the "0" position and a value is carried to the registering mechanism of higher order.

Preferably the teeth of the gear wheels 13, 15, and 16 are faceted at their edges, in order that they are more readily brought into engagement with each other, and the gear wheels 13 and 16 are placed closely together so that when shifting the gear wheel 15 from one to the other, gear wheel 15 is temporarily in engagement with both gear wheels 13 and 16 and all the gear wheels are set exactly into their proper positions and inaccuracies are avoided.

In the construction so far described the connection of the eccentric 58 with the gear wheel 15 is complicated for the reason that the rotary movement of the shaft $18^a$ must be transformed into a reciprocating movement perpendicular to the axis $18^a$. Furthermore, for shifting the gear wheel 15 and throwing the same into engagement with the wheel 16 or 13 much power is required if the gear wheels are not in the exact relative positions. For this reason I prefer a construction in which the trains of gear wheels are thrown into and out of operative position by radially retracting the gear wheels from each other. For thus moving the trains of gear wheels comparatively simple mechanism is required, because all the movements are performed within parallel planes, and the gear wheels are readily thrown into engagement with each other, even if they are not exactly in the proper relative positions, because the tapered form of the teeth insures the proper engagement thereof.

In Figs. 13 to 15 I have shown diagrams illustrating this embodiment of the invention. As shown the gear wheels 111 and 118 are adapted to be connected by two trains of gear wheels 112, 113, 114 and 115, 116, 117, and the said trains are thrown into and out of operation by radially retracting one of the wheels 121 or 122 out of mesh with the gear wheels 112 and 114 respectively. With gear wheel 121 in operative position as is shown in Fig. 13, the movement is transmitted from gear wheel 111 over the gear wheels 115, 121, 112, 113, and 114 to gear wheel 118, and with gear wheel 122 in operative position as is shown in Fig. 15, the movement is transmitted from gear wheel 111 over the gear wheels 115, 116, 117, 122, 114 to gear wheel 118. To insure the correct relative position of the gear wheels an intermediate gear wheel 123 is provided by reason of which the retracted gear wheel 121 or 122 takes part in the rotation of the train, and when changing over from one train of gear wheels to the other one temporarily both gear wheels 121 and 122 are in mesh respectively with the gear wheels 115 and 117, as is shown in Fig. 14, so that all the wheels are brought into exact relative positions.

A preferred mechanism for operating the trains of gear wheels has been shown in a diagrammatical way in Figs. 16 to 23. As shown the axis 120 of the gear wheel 116, which is adapted to be rocked for carrying a value from a registering mechanism of lower order to the adjacent one of higher order, is mounted on a link 124 suspended from a rocker 125 adapted to be rocked vertically by means of an operating member 126 suspended from an arm 125¹ of the rocker 125. The bottom end of the member 126 is connected by a link 127 with a rocker 128 having four arms 128¹, 128², 128³, and 128⁴ and suspended from an arm 129 having a rocking support at 129'. The lower arm 128¹ is in sliding engagement with a roof shaped cam member 130, the form of which is such that with the arm 128¹ in engagement with the left hand face of the cam the gear wheel 122 is in mesh with the gear wheels 114 and 117, and with the said arm in engagement with the right hand face the gear wheel 121 is in mesh with the gear wheels 112 and 115. With the said arm in the intermediate position both gear wheels 121 and 122 are in mesh with the respective gear wheels.

The operating member 126 is formed with an eye 126' engaging a cam disk 131' connected with the gear wheel 114' of the registering mechanism of lower order, as is shown in Fig. 22, and the gear wheel 114 is connected with a similar cam disk 131 adapted to transmit a carrying operation to the registering mechanism of the next higher order.

The carrying operation is performed in the succession illustrated in Figs. 16 to 21. In the position shown in Fig. 16, gear wheel 122 is in coupling position relatively to the gear wheels 117 and 114, and gear wheel 116 is in elevated position. Upon rotation in clockwise direction of the cam 131' by the registering mechanism of lower order gear wheel 116 is rocked downwardly and into the position shown in Fig. 17. Gear wheel 116 forming a part of the operative train of gear wheels, as is shown in Fig. 22, the numeral wheel 119 is advanced one value, as will appear from the diameter of the numeral wheel shown in Figs. 16 and 17 in dotted lines. Upon further movement of the cam 131' into the position shown in Fig. 18, operating member 126 is rocked to the right and shifts the arm 128¹ of the rocker 128 into the intermediate and elevated position, whereby gear wheel 121 is lifted into engagement with the gear wheels 112 and 115. As the cam 131' passes into the position shown in Fig. 19, the member 126 is further rocked to the right, so that arm 128¹ engages the right hand face of cam 130 and gear wheel 122 is retracted out of engagement with the gear wheels 114 and 117. In the position of the cam 131' shown in Fig. 20 the member 126 has been rocked downwardly and the gear wheel 116 upwardly, which movement of the gear wheel 116, however, has no effect on the numeral wheel 119, because gear wheel 117 is out of mesh with gear wheel 122. In the position shown in Fig. 21 the operating member 126 is again in intermediate position, and both gear wheels 121 and 122 are in engagement with their respective gear wheels 112, 115 and 114, 117. Finally the cam 126 restores all the parts into the initial position shown in Fig. 16.

Therefore, by a complete rotation of the numeral wheel of lower order the registering mechanism shown in the figures is successively set in the positions shown in Figs. 16 to 21, and a carrying operation is performed only when the registering mechanism passes from the position shown in Fig. 16 into that shown in Fig. 17. The cam 131' is so mounted relatively to the numeral wheel of lower order, that the position shown in Fig. 16 corresponds to the "9" position and that shown in Fig. 17 to the "0" position of the numeral wheel of lower order. The positions shown in Figs. 18 to 21 correspond to any of the intermediate numbers from "0" over "5" to "9" of the numeral wheel of lower order, and preferably the positions shown in Figs. 19 and 20 correspond substantially to the values "4" and "5" of the numeral wheel of lower order, and the positions shown in Figs. 18 and 21 to the numbers "2" and "7" respectively.

If the cam 131' rotates in the opposite direction, the registering mechanism is set in the successive positions in the opposite order, and the numeral wheel is turned backwards one value, as the mechanism passes from the position shown in Fig. 17 into that shown in Fig. 16, as will readily be understood from the foregoing description. If the gear wheel 111 is operated simultaneously with the carrying operation, both movements are added to or substracted from each other.

Therefore, also in the embodiment shown in Figs. 16 to 23 the carrying operation is performed together with the numeral wheel of lower order passing from the "9" to the "0" position or vice versa, so that the calculation is performed within a minimum of time and with a minimum of power, and the carrying operation is completed together with the main calculation.

In Figs. 24 to 34 I have illustrated a preferred construction of the mechanism described with reference to Figs. 16 to 23. The gear wheels and other parts of the registering mechanism are mounted on plates 132 and 133 and on an intermediate plate 134, and the said parts have received the same reference characters as the corresponding parts shown in Figs. 16 to 23.

From the rocker 125 the gear wheel 116 is suspended by means of two links 124 jointed to the axis 120 at opposite sides of the gear wheel. The rocker 128 is made in two parts disposed between the plates 132 and 133 and one at each side of the gear wheels 121, 122, and 123, and it is provided with pins 135 and 136 engaging in slots 129' and 130' made in the said walls. The upper slots 129' are vertical and have the function of the rocker 129 shown in Figs. 16 to 23 by guiding the rocker 128 in vertical direction. The lower slot 130' consists of two branches inclined downwardly and outwardly from a median point, its function being to throw either one of the gear wheels 121 and 122 or both of them into engagement with the gear wheels 112, 115 and 114, 117, as has been described above. To insure smooth movement of the rocker 128 the cam faces of the slot 130' are formed along circles the centers of which coincide with the points of contact of the gear wheels 121, 112, 115, and 122, 114, 117 respectively.

From the rocking lever 125 the operating member 126 is suspended which is connected at its bottom end by links 127 with the arm 128¹ of the rocker 128, and which is adapted to be operated by the cam 131' connected with the adjacent registering mechanism of lower order. As shown the gear wheels 114 are formed each with a diametrical slot 114' engaging a rib 131² of the cam 131' of the next higher order. As has been described with reference to Figs. 16 to 23, the operating member 126 performs vertical and horizontal movements in definite succession, and such movements may be imparted to the member 126 by two independent operating members. In Figs. 26 to 34 I have shown a single operating member for imparting the horizontal and vertical movements to the member 126, which member 126 is moved by the cam 131' substantially along the sides of a quadrangle. The cam 131' is formed with two concentric circular faces 131ᵃ and 131ᵇ of different radii connected by substantially straight faces 131ᶜ and 131ᵈ, the difference of the radii being substantially equal to the vertical and horizontal strokes of the member 126. The member 126 is formed with an eye enclosing the cam 131' and formed with lugs 37, 38, 39, and 41 in engagement with the cam 131'.

In Figs. 29–34 I have illustrated the successive steps of the movement imparted to the member 126 by the cam 131'. In the position shown in Fig. 29 the member is in its lower and forward position, the concentric face 131ᵃ engaging both the lugs 37 and 40. Upon rotation of the cam in the direction of the arrow $p^2$, the member is held in its forward position by reason of the concentric form of the faces 131ᵃ and 131ᵇ, while the upper face 131ᵈ engaging the upper lug 39 lifts the member 126 into the position shown in Fig. 30. Thereafter the member is held in elevated position by the concentric faces 131ᵃ and 131ᵇ, but it is shifted to the right by the cam face 131ᵈ engaging the lug 38, the member passing through the median position shown in Fig. 31 into the right hand position shown in Fig. 32. Thereafter the member is rocked downwardly substantially in vertical direction (Fig. 33), thereafter to the left in horizontal direction, and finally vertically upward into the initial position shown in Fig. 29. Upon rotation of the cam 131' in the opposite direction the succession of the movements is the reverse from what has been described.

This mechanism for transforming rotary movement into movement substantially along a quadrangle has a very smooth operation, the face 131ᵈ connecting the concentric faces having the function upon rotation of the cam not only to exert outward pressure on the member 126, but also in case of increased resistance to carry along the lug located at the rear thereof in the direction of the rotation and to force the corresponding concentric face firmly in contact with the said lug, which is therefore carried along by friction in the direction of the movement of the member 126. For example, in the position of the parts shown in Fig. 29 the face 131$^d$ forces the member 126 upwardly, and in case of an increased resistance it tends to shift the lug 39 to the right and to force the lug 37 into frictional engagement with the concentric face 131$^a$, which therefore carries the lug 37 upwardly and relieves the lug 39. In a similar way in the position shown in Fig. 34 the lug 37 is shifted forwardly and upwardly, and the lug 40 is brought into frictional engagement with the face 131$^a$ and pressed forwardly. Thus in any position and in any direction of rotation the movement of the member 126 is made easy by the frictional engagement of the cam 131 with the lugs of the member. For this reason the operation of the carrying mechanism is easy even if the cam faces 131$^c$ and 131$^d$ have a strong inclination relatively to the circumferential movement of the cam, and if many carrying operations are simultaneously performed.

In the construction described herein the lateral lugs 37 and 38 are necessary for the reason that movements in two perpendicular directions are necessary. If movement in one direction only is necessary, only the corresponding lugs are required, but also in this case I prefer to provide the lugs disposed along a line perpendicular to the line connecting the lugs which are directly operative and to mount the member operated by the cam with a certain clearance, in order to cause the frictional engagement of the subsidiary lugs with the cam in case of increased resistance and to obtain a more easy operation.

The operation of the mechanism is the same as has been described with reference to Figs. 13 to 23, so that a short reference will be sufficient. In the position of the parts shown in Fig. 27 gear wheel 122 is in engagement with gear wheels 117 and 114, while gear wheel 121 is in inoperative position. Therefore the values are transmitted from gear wheel 111 over gear wheels 115, 116, 117, 122, 114 to gear wheel 118 and the numeral wheel 119. Gear wheels 112 and 113 are inoperative. As the operative train includes gear wheel 116 a carrying operation is performed, as the numeral wheel of lower order passes from "9" to "0" or vice versa. In the position of the parts shown in Figs. 24 and 28 both trains of gear wheels are temporarily operative. Thereafter member 128 is further rocked to the right for retracting gear wheel 122 away from the gear wheels 114 and 117, while gear wheel 121 remains in position for coupling the gear wheels 115 and 112. Therefore the values are transmitted from gear wheel 111 over gear wheels 115, 112, 113, 114 to gear wheel 118 and the numeral wheel. Gear wheel 116 is inoperative and is returned into initial position by being rocked upwardly by the rocker 125.

In the example so far described coupling gear wheels are provided for alternately throwing the trains of gear wheels into operation. Now I shall describe examples in which such coupling gear wheels are dispensed with, and in which the play of the parts and large masses are avoided. With this object in view I construct the trains of gear wheels so that they are thrown into or out of operation by rocking one or more of the gear wheels of the trains into or out of engagement with the driving or driven gear wheels.

A simple construction of this type has been shown in a diagrammatical way in Figs. 35 to 37. As shown in the said figures the gear wheels to be rocked are mounted on a rigid member or frame 241 rockingly mounted on the axis of a stationary gear wheel. In the construction shown in the said figures the axes of the gear wheels 212 and 217 are stationary and the transmitting gear wheels 216 and 215 are mounted on the rockable frame 241. The gear wheel 215 can be correctly thrown into or out of engagement with the gear wheel 212 only if the tangent $r'$ common to the gear wheels 215 and 212 and passing through the point $p^3$ of the wheel 212 is tangential to the pitch line of the gear wheel 217. In this case the gear wheel 215 is moved into or out of engagement with the gear wheel 212 in a direction exactly perpendicular to the tangent $r'$ or in the direction of the line connecting the axes of the said gear wheels, as appears from the corresponding radii shown in Figs. 35 and 36 and in the diagram shown in Fig. 37. It will be understood that when thus moving the gear wheels they are thrown into or out of operation without any shock, even if the wheels rotate while being rocked.

In Figs. 38 and 39 I have shown a modification in which the axes of the transmitting gear wheels 212, 213, and 214 are disposed along the corners of a polygon, the frame 242 connecting the said gear wheels being constructed accordingly. Also in this case the tangent $r^2$ passing through the point $p^4$ common to the pitch lines of the gear wheels 214 and 217 is tangential to the pitch line of the relatively stationary gear wheel 212.

In Figs. 35 to 39 I have shown examples in which the frames 241 and 242 carry two rockable gear wheels 216, 215 and 213, 214 respectively; but I wish it to be understood that I do not limit myself to this number of gear wheels. Where an even number of rockable gear wheels is provided, as is shown in the said figures, all the gear wheels are located at the same side of the tangent $r^1$ or $r^2$. But where an uneven number of gear wheels is provided the point of contact of the rockable gear wheel and the cooperating gear wheel (214 and 217) must be on the opposite side of the said cooperating gear wheel.

I do not limit myself to the use of the system of rockable gear wheels shown in Figs. 35 to 39 in a calculating machine.

The system shown in Figs. 35 to 37 may be combined with the system described with reference to Figs. 1 to 3 for imparting additional or carrying movement to the driven gear wheel, by mounting the gear wheel 216 so as to be shiftable transversely of the gear wheels 217 and 215. A preferred construction has been shown diagrammatically in Figs. 40 to 45. All the gear wheels are disposed in the same plane, so that the registering mechanism of each order requires little space in lateral direction. The registering mechanism comprises a driving gear wheel 211 adapted to be operated in any known or preferred way for transmitting values from 1 to 9 to the numeral wheel 219 connected with a coaxial gear wheel 218. Between the gear wheels 211 and 218 two trains of gear wheels 212, 213, 214 and 215, 216, 217 are interposed, the first one being adapted to transmit only the values from 1 to 9 of the ordinary calculation, and the second one being adapted in addition to transmit carrying operations, which additional or carrying operation is performed by moving the axis 220 of gear wheel 216 in upward or downward direction. Either one of the said trains of gear wheels is made operative by lifting and lowering the gear wheels 213 and 214 or 216 and 215.

The upper train of gear wheels 215, 216, 217 is constructed in the manner described with reference to Figs. 1 and 35, and the lower one in the manner described with reference to Figs. 38 and 39, the axis of the gear wheel 213 being located below the line connecting the axes of the wheels 212 and 214 in order to avoid interference of the gear wheels 213 and 216. The gear wheels are mounted so that the common tangent of the gear wheels 214 and 217 when brought into mesh with each other in the manner shown in Fig. 42 is tangential to the pitch line of the gear wheel 212, and in a similar way the tangent of the meshing gear wheels 212 and 215 is tangential to the pitch line of the gear wheel 217. Therefore the gear wheels 212, 213, and 214 may be connected by a rigid frame 242, which frame is rockingly mounted on the axis of gear wheel 212. The gear wheels 215, 216, and 217 of the upper train are mounted on a frame 241 jointed at one end to a link 243. The opposite end of the said frame carries a controlling member 226 adapted to be operated by a cam connected with the adjacent registering mechanism of lower order. By the said cam the frame 241 is rocked upwardly and downwardly for transmitting additional or carrying movement to the numeral wheel 219. As has been described with reference to Figs. 1 to 3 the axis 220 must be moved for this purpose through a distance corresponding to one half of the distance $t$ of two consecutive teeth. Therefore the controlling part 226 must be elevated or lowered at the axis of the gear wheel 217 a distance corresponding to the pitch of the said gear wheel. Furthermore, the frame 241 is adapted to be moved upwardly and downwardly at its opposite end by the link 243, for throwing the gear wheel 215 into or out of engagement with the gear wheel 212. The said movements at the opposite ends of the frame are combined at the axis 220 in the manner required for correct operation.

The succession of the aforesaid movements has been illustrated in Figs. 40 to 45. In the position shown in Fig. 40 the link 243 is in its lower position, the operating member 226 is in its upper position, and the frame 242 is in its lower position. Now, the operating member 226 and the axis 220 are rocked downwardly and into the position shown in Fig. 41. Thereby the gear wheels 216, 217, and 218 are rotated in the directions of the arrows shown in Fig. 40, and numeral wheel 219 is advanced one value, as has been indicated by the diameters of the numeral wheel shown in Figs. 40 and 41. By rocking the frame 242 upwardly and into the position shown in Fig. 42 the gear wheels 214 and 217 are thrown into engagement with each other. Now link 243 is rocked upwardly and into the position shown in Fig. 43, and gear wheel 215 is retracted out of mesh with gear wheel 212. Operating member 226 and axis 220 of gear wheel 216 are rocked upwardly and into the position shown Fig. 44. Thereby the gear wheels 216 and 215 are rotated in the directions of the arrows shown in Fig. 43, which rotation, however, is inoperative as far as the numeral wheel is concerned. Now link 243 is again rocked downwardly and into the position shown in Fig. 45, and the gear wheels 215 and 212 are thrown into mesh with each other. Finally frame 242 is rocked downwardly and retracts the gear wheel 214 from gear wheel 217, whereupon all the parts are again in the positions shown in Fig. 40, with exception, however, of the numeral wheel which has been advanced one value, as is indicated by the diameters of the wheels shown in all the figures in dotted lines.

If the controlling movements are performed in the opposite order, that is from Fig. 40, successively over Figs. 45, 44, 43, 42, and 41, the gear wheels are turned in the opposite directions, and the numeral wheel is turned backwards one value between the positions shown in Figs. 41 and 40. If in addition gear wheel 211 is rotated, such rotary movement is transmitted to gear wheel 218 either through the train 212, 215, 216, 217 or through the train 212, 213, 214, 217, and the additional movement caused by the controlling member 226 is added to the rotary movement transmitted from gear wheel 211. As appears from Figs. 40 to 45 the transmission from gear wheel 211 to gear wheel 218 can always be effected through one of the trains of gear wheels, and before throwing one of the trains out of operation both trains are temporarily operative, as is shown in Figs. 42 and 45, so that also when changing the trains of gear wheels exact transmission from gear wheel 211 to gear wheel 218 is insured.

From the description of the operation of the mechanism it will be understood that the carrying operation is performed simultaneously with the transmission of the values from 1 to 9.

In Figs. 46 to 51 I have shown a practical embodiment of the mechanism explained with reference to Figs. 40 to 45. The registering mechanisms are mounted on vertical plates 232 and 233 secured to a horizontal plate and formed with cut-out portions for the passage of various parts therethrough, as is necessary for transmitting the carrying operation from one registering mechanism to the adjacent one. The carrying operation is transmitted from a mechanism of lower order to a mechanism of higher order by means of a gear wheel 217 connected with the mechanism of lower order and taking part in the rotation thereof. The gear wheel 217 is connected by means of a pin 217' with a cam 231 acting on three controlling members 241, 246, and 250 shown in detail in Figs. 49 to 51. Fig. 49 shows the controlling member 241 controlling the upward and downward movement of the axis 220 of the gear wheel 216, and the member 246 controlling the rocking movement of the link 243 for throwing the upper train of gear wheels 215, 216, 217, into and out of operation.

The member 241 controlling the rocking movement of gear wheel 216 is rockingly mounted on a shaft 244 disposed on the rocker 243 having its fulcrum at 243' on the plate 233, and it carries the bolt 220 on which gear wheel 216 is mounted. The member 241 is bifurcated at its end 226 and the bifurcated portion straddles the cam 231, the construction of the said cam and the bifurcated portion being such that when turning the cam a distance corresponding to a unit the bolt 220 is elevated or lowered a distance equal to one half of the pitch of the gear wheels. The position of the cam relatively to the cooperating numeral wheel 219 is such that the bolt 220 is thus elevated and lowered with the parts in the positions shown in Fig. 49 exactly when the numeral wheel of lower order passes from the "9" position to the "0" position, or vice versa, as has been explained with reference to Figs. 40 and 41. When further turning the cam 231 the concentric faces of the cam engage the bifurcated portion 226 and hold the same in elevated or lowered position, and in some cases I provide stop members for insuring the exact position of the portion 226. When the cam is in the position at an angle of 180° to the one shown in Fig. 49 the bifurcated portion 226 and the bolt 220 are rocked backwardly, which operation corresponds to Figs. 43 and 44. When thus returning the parts into initial position the period of time and the position of the parts relatively to the numeral wheel is of less import, because the backward movement of gear wheel 216 is inoperative as far as the numeral wheel is concerned. However, in order to obtain uniform operation I prefer to perform the backward movement when the numeral wheel of lower order is between the "4" and "5" positions. As appears from the foregoing description one complete rotation of the cam 231 causes an additional movement of the bolt 220 and the return movement of the bolt.

The link 243 is operated by means of an arm 246 of a rocker mounted on a pivot bolt 245 secured to the plates 232 and 233, which arm is slotted at its end and engages a pin 247 secured to the link 243. The rocker is provided with a bifurcated portion 248, 249 straddling the cam 231, so that the arm 246 and the link 243 are once rocked to and fro upon a complete rotation of the cam, which operation has been explained in detail with reference to Figs. 45, 40, and 41.

In Fig. 50 I have shown the members controlling the lower frame 242. The bolt 245 carries a second rocker 250 engaging with a slot 251' a pin 251 secured to the frame 242. The rocker 250 is formed with arms 252 and 253 straddling the cam 231, so that by each rotation of the cam a to and fro movement is imparted to the frame 242, which operation has been described with reference to Figs. 45, 40, and 41.

The arms 248 and 249 connected with the arm 246, and the arms 252 and 253 connected with the arm 250 are different in form, the contacting portions of the arms 248 and 252 operative for throwing the respective gear wheels 215 and 214 into engagement with the gear wheels 212 and 217 respectively being comparatively long and curved according to the concentric part of larger radius of the cam 231, while the contacting parts of the arms 249 and 253 are comparatively short. Thereby, when throwing the trains of gears into and out of operative positions relatively to the numeral wheel, both trains are temporarily operative, as has been described with reference to Figs. 42 and 45. In the position of the parts shown in Fig. 51, which corresponds to Fig. 45 and in which the cam 231 is directed upwardly, the cam makes contact with the arm 248 as well as with the arm 252, so that both the upper and lower trains of gear wheels are closed. The same condition prevails when the cam is directed downwardly, according to Fig. 42. The circumferential dimensions of the concentric part of larger radius of the cam and the curved parts of the said arms are such that they form nearly a complete circle. Therefore at any moment at least one train of gear wheels is closed, and one gear wheel 214 or 215 is thrown out of mesh with the gear wheel 217 or 212 cooperating therewith after the other gear wheel has been completely brought into engagement with its gear wheel and does not permit any idle movement of the mechanism.

Also in this case care must be taken that the controlling operations are performed in the proper sequence, for which purpose the controlling members are set in the correct positions on their axes.

By turning the cam 231 from the registering mechanism of lower order a value is carried over to the registering mechanism of higher order, which operation is performed while the transmission of the values from 1 to 9 from gear wheel 211 to the numeral wheel 219 is continued in the registering mechanism of higher order, which mechanism is also adapted simultaneously to operate the carrying mechanism of the next higher order.

In Figs. 52 to 55 I have shown a modification which is similar to that described with reference to Figs. 40 to 51, in which, however, a single operating member 341 is provided for controlling the carrying means as well as the means for rendering the trains of gear wheels operative and inoperative, said operating member performing vertical reciprocating movements for performing the carrying operation and horizontal reciprocating movements for controlling the trains of gear wheels. A cam member 326 of member 341 is engaged by a cam 331 connected with gear wheel 317' of lower order. When exchanging the said trains both trains are temporarily in operative positions, for which purpose the link 343 and the frame 342 are provided with arms 343' and 342' connected by toggle levers 391 and 392 adapted to be moved to and fro from the operating member 341 by means of a link 393 connected to the joint 399 of the levers and a rocker 394 jointed to member 341 and having its fulcrum at 394'. When the levers 391 and 392 are in alignment the arms 342' and 343' are spread apart and the gear wheels 314 and 315 are in mesh with the gear wheels 317 and 312, so that both trains of gear wheels 315, 316, 317 and 312, 313, 314 are closed. When the toggle levers are in the position shown in Fig. 52 an arm 395 of lever 391 bears on a pin 396 secured to the arm 343', so that gear wheel 315 is in mesh with gear wheel 312. With the toggle levers in their inner positions shown diagrammatically in Fig. 54 an arm 397 of lever 392 bears on a pin 398 secured to a relatively fixed part of the frame supporting the mechanism, so that gear wheel 314 is in mesh with gear wheel 317, while gear wheel 315 is out of engagement with gear wheel 312. When the toggle levers pass from one end position into the other one they pass through the median position shown in Fig. 55 in which both gear wheels 314 and 315 are operative. As compared to the construction shown in Fig. 28 in which the slot 130' has a similar function the construction shown in Figs. 52 to 55 is preferable for the reason that the friction is reduced. I wish it to be understood that my invention is not limited to the specific construction of the mechanism shown in Figs. 52 to 55.

In the examples shown in Figs. 40 to 55 the additional or carrying movement of the gear wheels 216 or 316 and the movement of the gear wheel 215 or 315 are brought about by moving the lever 241 or 341 at both ends. Now I shall describe a modification in which the said movements are performed in directions perpendicular to each other, and in which the upper train of gear wheels is opened between the gear wheels 416 and 417.

As shown in Fig. 56 the lower train of gear wheels 412, 413, and 414 is mounted on a rigid frame 442, which is possible because the tangent $m^4$ of the pitch lines of the gear wheels 414 and 417 passing through the point $p^4$ common to the said pitch lines is tangential to the pitch line of the relatively stationary gear wheel 412. The axes of the gear wheels 412, 415, and 416 must be connected by links 454 and 455 jointed to each other, because the tangent $n^4$ passing through the point $q^4$ in which the pitch lines of the gear wheels 416 and 417 make contact is not tangential to the pitch line of gear wheel 412. The axis 420 of gear wheel 416 is not guided on a circle concentrical of the axis of gear wheel 412 but on another curve, for throwing the gear wheel 416 into and out of engagement with the gear wheel 417 without shocks. The form of the said curve must be such that when retracting gear wheel 416 from gear wheel 417 the tooth of gear wheel 416 located in the point $q^4$ is moved radially or nearly radially away from the wheel 417. The curved path of the bolt 420 and its displacement by a length equal to one half the pitch $t$ of the gear wheels have been shown in Fig. 56 in dotted lines. On the pitch lines of the gear wheels 415, 416 and 417 I have marked points indicating the relative positions of the gear wheels, and the said points show that the gear wheel 416 is moved into engagement with the gear wheel 417 along a straight line.

The sequence of the movements has been shown in Figs. 57 to 62. It is similar to that described with reference to Figs. 40 to 45, the difference of the operation residing in that the upper train of gear wheels is opened between the wheels 416 and 417 in the positions shown in Figs. 60 and 61.

For performing a carrying operation gear wheel 416 is rocked downwardly from the position shown in Fig. 57 into that shown in Fig. 58. Thereafter frame 442 is rocked upwardly and with gear wheel 414 into engagement with gear wheel 417, so that now both trains of gear wheels are temporarily operative, as is shown in Fig. 59. Thereafter the upper train is broken by retracting gear wheel 416 from gear wheel 417 (Fig. 60), and gear wheel 416 is rocked upwardly (Fig. 61). In Fig. 62 the upper train of gear wheels has been closed, whereupon gear wheel 414 is retracted away from gear wheel 417, so that all the parts are restored into the initial position shown in Fig. 57, with the exception, however, of the numeral wheel 419 which has been advanced one step.

Figs. 63 to 70 show a practical embodiment of the invention described with reference to Figs. 56 to 62. The mechanism is mounted on a plate 432 formed with apertures for the passage of certain parts therethrough. The bolt 412' carrying the gear wheel 412 is fixed to the said plate 432, and it has the frame 442 for the lower train of gear wheels 412, 413, and 414 and the link 454 rockingly mounted thereon. The link 454 is jointed to the link 455 and the bolt 415' connecting the said links carries the gear wheel 415. On a bolt 420 secured to the free end of the link 455 the gear wheel 416 is mounted.

The mechanism for guiding the bolt 420 carrying the gear wheel 416 along a curve, as has been described with reference to Fig. 56, has been shown in Fig. 68. As shown in the said figure the bolt 420 is engaged by a slot 462 of a lever 456 jointed to a link 457 and bifurcated at its free end as is shown at 426, 426. The bifurcated end 426 is engaged by a cam 431 adapted to impart carrying movement and return movement to gear wheel 416 and for this purpose to reciprocate the lever 456 by means of concentric faces 431' and 431 in vertical direction. By the link 457 the rear end of the lever 456 is guided along a curve, and both movements are combined so that the bolt 420 is moved along the desired path described with reference to Fig. 56. It will be understood that my invention is not limited to the mechanism shown in Fig. 68.

In view of the correct sequence of the operations the horizontal and vertical movements of the lever 456 relatively to the gear wheel 417 must be performed by two oppositely directed cams. Furthermore the frame 442 is independently controlled by a third cam. The said cams have been shown in Figs. 68 and 69, 431 being the aforesaid cam for imparting vertical or carrying movement to the lever 456, 458 being the cam for opening and closing the upper train of gear wheels, and 459 being the cam for rocking the lower train of gear wheels into and out of engagement with gear wheel 417.

For imparting the additional or carrying movement to the gear wheel 416 the lever 456 is bifurcated at its outer end, as is shown at 426, and the arms of the bifurcated portion are formed each with two elongated curved cam faces connected by rectilinear faces, the latter permitting the lever 456 to be moved in opposite directions by the cam 458. The position and the shape of the cam 431 and the cam faces of the arm 426 are such that the vertical reciprocating movements are performed exactly when the numeral wheel of lower order passes from its "9" position to its zero position, while the return movement is performed substantially when the said numeral wheel passes from "4" to "5".

The lever 460 for the lateral movement is rigidly connected with the lever 456 by means of a pin 461 and the bolt 420. It is formed with arms 448 and 449 which are provided with elongated cam faces for reciprocating the lever 456 in transverse direction by means of cam 458.

The third cam 459 shown separately in Fig. 70 is in engagement with arms 452 and 453 of the lever 442, and it is adapted to raise and lower the lever 442. It must be set according to the fulcrum of the said lever.

The cam faces of the arms 448 and 453 for throwing the gear wheels 416 and 414 into engagement with the gear wheel 417 are longer than the arms 449 and 452 for retracting the same. Their lengths correspond to the curved faces of the cams 458 and 459, and they are such that when the trains of gear wheels are exchanged both trains are temporarily operative.

Fig. 68 shows all the controlling parts, and it shows that for both directions of rotation and in any position of the parts one of the long cam faces 448 or 453 is released by the cooperating cam 458 or 459 only after the other one has been brought into its outer position.

The operation of the controlling mechanism is as follows: In the position of the parts shown in Figs. 68 and 69 the cam 458 engaging the arm 448 has set gear wheel 416 into position for engagement with gear wheel 417, and the cam 459 has retracted gear wheel 414 away from gear wheel 417. Now the cams are rotated in anti-clockwise direction. Cam 431 engaging the upper arm 426 rocks lever 456 upwardly and raises gear wheel 416 a distance corresponding to $\frac{1}{2}t$, which movement results in a rotation of gear wheel 417 through an angle corresponding to the pitch $t$. Thereby one value is transmitted to numeral wheel 419. Now cam 431 is directed upwardly, cam 458 is about to release arm 448 and cam 459 is in engagement with cam face 453 for throwing gear wheel 414 into mesh with gear wheel 417. Temporarily both trains of gear wheels are closed, upon further rotation of the cams, cam 458 engages cam face 449 and shifts lever 456 to the right the upper arm 426 still bearing on cam 431. After gear wheel 416 has thus been retracted away from gear wheel 417, cam 431 engages the lower arm 426 and rocks lever 456 downwardly for returning gear wheel 416 into initial position. Finally all the parts are returned into the position shown in Fig. 68.

To obtain easy operation of the parts performing the additional movement the hole 462 of lever 456 affords a little play at its rear side for the bolt 420. If when raising or lowering the lever the resistance is high, the lever 456 is pressed forwardly by the frictional engagement of either one of its arms 426 with the cam 431, so that the arm 448 is pressed against the cam 458 and the additional or carrying movement is supported. Therefore the slight play of the bolt 420 within the hole 462 results in an easy operation.

In the examples so far described the additional or carrying movement is effected by shifting one of the gear wheels. In Fig. 71 I have shown a modification in which the carrying operation is effected by shifting two gear wheels, which results in a more simple construction of the mechanism. In the construction shown in the said figure the driving and driven gear wheels 511 and 517 are mounted on relatively fixed shafts, and they are connected by a train of gear wheels 515 and 516 mounted on a frame 563 having a rocking support on a relatively fixed fulcrum 563'. For performing a carrying operation and advancing the gear wheel 517 one step both gear wheels 515 and 516 are shifted tangentially of the axes of the gear wheels 512 and 517 respectively, for which purpose the fulcrum 563' is located at the intersection of the lines connecting the centers of the gear wheels 516, 517 and 512, 515 respectively. When rocking the frame 563 in the direction of the arrow $a$ shown in Fig. 71 the gear wheels are turned in the directions of the circumferential arrows $b$, $b^1$, $b^2$, and assuming the gear wheel 512 to be at rest, the gear wheel 517 is advanced one step $t$, if at a distance of $x+y$ away from the fulcrum the frame is shifted a distance equal to the pitch $t$, the letters $x$ and $y$ indicating the distances of the fulcrum 563' from the points of contact of the gear wheels 516, 517 and 512, 515 respectively.

The principle described with reference to Fig. 71 is particularly useful in the embodiment shown in Fig. 72 in which the gear wheels are disposed symmetrically along a hexagon in which the tangents $m^6$ passing through the points of contact $p^6$ of the gear wheels 614, 617 and 617, 616 respectively are tangential to the pitch line of the relatively stationary gear wheel 612, because in this case and when mounting the gear wheels on rigid frames the respective gear wheels are thrown into and out of engagement without impeding the movement of each other and causing shocks, as will readily be understood from the explanation given with reference to Fig. 35. The upper train of gear wheels performs two movements, one for carrying a value to the numeral wheel and the other one for throwing the gear wheels 616 and 617 into and out of operation, for which purpose the frame carrying the gear wheels 615 and 616 is connected by a link 654 to the axis of gear wheel 612. The point of the upper frame 663 located near the center of the hexagon describes a quadrangle, the horizontal sides of which correspond to the additional or carrying movement, while the vertical sides correspond to the opening and closing movements of the upper train of gear wheels. The lower train of gear wheels 613 and 614 are mounted on a rigid frame 642 rockingly mounted on the axis of the gear wheel 612, and it describes only vertical movements near the center of the hexagon, because it is operated only for opening and closing the said train.

The sequence of the operations of the system is shown in Figs. 73 to 78, and it corresponds exactly to the sequence described with reference to Figs. 16 to 21, with exception, however, of the manner of performing the additional or carrying movement, which is done between the positions shown in Figs. 73 and 74, and Figs. 76 and 77 by shifting the gear wheels 615 and 616.

Preferably, the controlling operations are performed at the center of the hexagon; but I wish it to be understood, that I do not limit myself to this feature.

For performing a carrying operation the members 654 and 663 are rocked from the position shown in Fig. 73 to the right and in the direction of the arrow $a^6$, so that the gear wheels 615, 616, 617 and 618 and the numeral wheel 619 are rotated a distance corresponding to one value, the movement being indicated in Figs. 73 and 74 by arrows and diameters of the gear wheels. Thereafter the frame 642 is rocked upwardly and with the gear wheel 614 into mesh with gear wheel 617, as is shown in Fig. 75. Now both trains of gear wheels are temporarily operative, until the frame 663 and the link 654 are again rocked to the right for retracting the gear wheel 616 from gear wheel 617, as is shown in Fig. 76. Thereafter the frame 663 and the link 654 are again rocked to the left for returning the gear wheels 615 and 616 into initial positions (Figs. 77 and 78), and finally the frame 642 is again rocked downwardly for retracting gear wheel 614 from gear wheel 617, whereupon all the parts are in initial positions, with exception, however, of the numeral wheel 619 which has been advanced one step.

In Figs. 79 to 86 I have shown a practical embodiment of the system described with reference to Figs. 72 to 78. The mechanism is mounted on plates 632. As appears from Fig. 79 the gear wheels 612, 613, 614, 615, 616, and 617 are so disposed that the engagement is correct, if the circle is closed and the gear wheels 615 and 616 have been rocked forwardly or backwardly for performing the carrying operation.

The axis 612' of gear wheel 612 is secured to the plate 632, and it carries the lower rigid frame 642, 642' on which the gear wheels 613 and 614 are mounted, and the link 654 carrying the gear wheel 615 and a link or a frame 663 on which the gear wheel 616 is mounted. As appears from Figs. 80 to 83 the frame 642, 642' consists of two parallel plates connected by the axes 613' and 614' of the gear wheels 613 and 614, and the links 654, 654' is made in two parts connected by the shaft 615' of the gear wheel 615.

The cam 631 is not mounted on the axis of gear wheel 617, as has been described in previous examples, but it is disposed at the center of the hexagon and on an axis 631' mounted in the plate 632 and having a gear wheel 664 mounted thereon which is in mesh with the gear wheel 617 of lower order. Gear wheel 664 and cam 631 are connected with each other by a slot 664' and a rib 631².

The frame carrying the gear wheel 616 is made in two sections 663 and 663' rigidly connected by the axes 615' and 616' of the gear wheels 615 and 616.

The controlling mechanism for the said frame is shown in Fig. 84. As has been described with reference to Fig. 72 the part of the frame 663 located near the center of the trains of gear wheels must be moved through a quadrangle the horizontal sides of which correspond to the additional or carrying operation, while the vertical sides correspond to the movements for throwing the gear wheel 616 into and out of engagement with the gear wheel 617. To perform these movements the cam 631 is formed with two concentric faces of different radii and straight faces connecting the same.

The frame 663 is formed with an aperture the wall of which is provided with four projections 637, 638, 639, and 640 engaged by the cam 631 and between the said projections the frame is cut out to permit rotation of the cam. The projections 637 and 638 are operative for throwing the gear wheel 616 out of and into engagement with the gear wheel 617, while the projections 639 and 640 control the lateral movement of the gear wheels 615 and 616 for performing the carrying operation.

The operation of the controlling mechanism is substantially the same as has been described with reference to Figs. 27 to 34. But the movements are directly transmitted to the frame 663, so that the intermediate levers provided in the construction shown in Fig. 37 are dispensed with. Also in the construction shown in Fig. 84 the movement of the frame 663 is assisted by the projection for example 638 located at the rear of the operative projection 639, because in case of an increased resistance of the cam on the operative projection the inclined face of the cam 631 forces the said rear projection by friction against the concentric face of the cam, so that the rear projection is moved in the proper direction for reducing the friction of the cam on the operative projection. This results in an easy operation of the mechanism.

In Fig. 85 I have shown the mechanism controlling the lower frame 642 which must be raised and lowered for throwing the gear wheel 614 into and out of engagement with the gear wheel 617. The cam 631 and the projection 638 hold the upper train of gear wheels only for a short period of time in closed position. Therefore, the lower train is closed for a comparatively long period of time, so that both trains of gear wheels are temporarily closed in order to insure correct transmission, and to avoid shocks by the gear wheels striking against each other when throwing the same into mesh. For this reason two cams 665 and 666 are provided which are made integral with the cam 631. The cam 665 cooperates with a lug 667 provided on the frame 642 for imparting slight initial rocking movement to the frame, while cam 666 is formed with a long concentric face adapted to cooperate with an arm 668 for holding the gear wheels for a longer period of time in engagement with each other. The arm 668 might be made with a longer contacting face and the cam 666 with a shorter one, the important point being that both trains of gear wheels are temporarily in simultaneous engagement when they are exchanged.

In the construction so far described the cam 631 and the eye of the frame 663 must be exact in form in order to insure a correct controlling operation, and in some cases I provide stop members for limiting the outward movements of the frame. In case of non-exact construction of the said parts I insure exact operation and correct engagement of the teeth by means of cooperating tongues 669 and 670 provided respectively on the frames 663 and 642, which tongues are disposed so that, with all the gear wheels in correct engagement and with the gear wheels 615 and 616 shifted forwardly or backwardly, they are respectively with opposite sides in contact with each other, as appears from Figs. 75 and 78. In the said figures the tongues are disposed internally of the trains of gear wheels, while in the construction shown in Figs. 84 and 85 they are located outside the trains, the last named construction being preferable for the reason that the stroke of the tongues when moving into or out of engagement is larger than in the construction shown in Figs. 75 and 78. The said tongues are pointed so that in case of inexact position of the parts they guide themselves into correct position, which position is attained when the gear wheels get into engagement. The operation of the tongues has been shown diagrammatically in Fig. 86. It should be borne in mind that the upper frame 663 and its tongue 669 describe a quadrangle, while the lower frame and its tongue 670 are moved in vertical direction only. In the positions indicated by the letters $d$, $e$, $f$, and $g$ the lower tongue 670 is in its uppermost position, and the upper tongue 669 is first retracted upwardly from the setting position at the left of the tongue 670 and in the direction of the arrow, and it successively moves through the positions $e$, $f$, and $g$ to the right hand side of the tongue 670 as is shown in position $g$. Now the lower tongue 670 is moved downwardly and permits the tongue 669 to pass from the right to the left, that is from position $g$ to position $i$, whereupon the lower tongue moves upwardly and insures correct engagement of the gear wheels with gear wheel 616 in engagement with gear wheel 617 and in its left hand end position corresponding to Fig. 73. Therefore exact engagement of the gear wheels is insured in case of inaccurate construction and wear of the controlling members, so that the teeth of gear wheel 616 are smoothly retracted from gear wheel 617, gear wheel 616 is turned backwardly exactly one tooth, and it is thereafter smoothly brought into engagement with gear wheel 617 and advances the same a distance corresponding to the pitch for carrying one value to the numeral wheel. By reason of my improved construction the gear wheels can not be thrown too far or lag behind in case of rapid operation.

The setting means need be operative only for insuring exact inward movement of the frame 663, because the outward movement is limited by stops 671 and 672 shown in Fig. 84.

It will be understood that the setting means 669 and 670 and the stops 671 and 672 may be provided at any suitable part of the mechanism where the frames 642 and 663 move substantially in vertical direction.

In Figs. 87 and 88 I have shown a modification in which the upper train of gear wheels is guided relatively to the plate 732 supporting the mechanism. For this purpose the plate 732 and the frame 763 carrying the gear wheels 715 and 716 of the upper train are equipped respectively with cooperating lugs 773 and 774 located at a part of the frame 763 moving substantially through a quadrangle. The lugs are formed at their upper and lower ends with wedges constructed so as to move the frame in proper position before the gear wheels get into engagement with each other. Also in this case stops are provided for limiting the outward stroke of the frame.

In both cases the means controlling the additional or carrying movement are exactly guided, while the gear wheels may be rocked more or less away from each other without causing inaccurate calculation. Therefore I prefer to provide the guiding means at such parts where the movement for throwing the gear wheels out of engagement with each other is large as compared to the additional or carrying stroke. For this reason in the construction shown in Figs. 84 and 85 the arms 669 and 670 are disposed a large distance away from the fulcrums 612' and 615' of the frames 642 and 663. Preferably also the guiding means shown in Figs. 87 and 88 are disposed at this part. In the construction shown in Figs. 84 to 86 in addition the movement of the lower frame 642 is made use of for setting the parts in the proper positions, so that the arms 669 and 670 are easily moved into proper engagement, as appears from the elongated points shown in Fig. 86.

I wish it to be understood that guiding means of the constructions shown in Figs. 84 to 88 may be provided in all the constructions described herein and at any suitable part of the mechanisms where the movements for throwing the gear wheels out of operation and for performing the additional or carrying operation are substantially perpendicular to each other, and in any case also the movement of the non-carrying frame may be made use of.

The carrying operation is performed in a mechanism whenever the numeral wheel of lower order passes from the "9" position to the "0" position, and during the carrying operation the train of gear wheels capable of the additional or carrying movement must be in operative position, while at the same time the train of gear wheels having no additional movement must be inoperative. According to the direction of rotation of the gear wheel of lower order operating the carrying mechanism in some cases a reversing gearing or the like must be provided in order to insure the proper direction of rotation of the numeral wheel of higher order. When the controlling cam connected with the registering mechanism of lower order is in the position in which the upper or carrying train of gear wheels is in operative position rotation of the cam in one direction imparts to the gear wheels rotation in such a direction that the gear wheel connected with the next cam is rotated in the same direction as the said cam of lower order. This condition is important for obtaining correct carrying operation.

A characteristic feature of my improved carrying mechanism is that there are two trains of gear wheels intermediate the counting mechanism and the numeral wheels, one a non-variable train of gear wheels adapted to transmit the values of the ordinary calculation from the counting mechanism to the numeral wheel, and the other one a variable train of gear wheels adapted to transmit the values of the ordinary calculation and in addition capable of transmitting a carrying movement from the registering mechanism of lower order to the adjacent numeral wheel of higher order, that during the carrying operation the said variable train of gear wheels is operative and the nonvariable train inoperative, that in another position of the numeral wheel of lower order, preferably between the "4" and "5" positions of the said numeral wheel of lower order, the carrying mechanism is returned into initial position, while the variable train is inoperative and the nonvariable train operative.

Therefore, when in the registering mechanism no calculation is performed and the numeral wheel of lower order performs a complete rotation, the operation is as follows: With the numeral wheel of lower order in the "9" position, the non-variable train is inoperative and the variable train is operative. As the numeral wheel of lower order passes from the "9" position to the "0" position the variable train is operated for advancing the numeral wheel of higher order one step. As the numeral wheel of lower order passes from the "0" position substantially to the "4" position the non-variable train is thrown into operative position and thereafter the variable train is retracted from the numeral wheel of higher order. Between the "4" and "5" positions of the gear wheel of lower order the variable train is returned into initial position by operating the same in a direction opposite to the carryng operation, which return movement, however, has no influence on the numeral wheel of higher order. Between the "5" and "9" positions of the numeral wheel of lower order at first the variable train is thrown into operative position, and thereafter the non-variable train is made inoperative, so that all the parts are again in the initial position, with exception of the numeral wheel of higher order which has been advanced one step.

If the numeral wheel of lower order is operated in the opposite direction, the succession of the said operations is the reverse from what has been described, and the numeral wheel of higher order is turned backwardly one step.

If simultaneously with the carrying operation the registering mechanism is operated, such movement is simultaneously transmitted to the numeral wheel through one or the other of the transmission gears, and such operation can be performed in any direction and at any time. Any desired number of registering mechanisms may be disposed one beside the other, and the registering mechanism of each order controls the carrying operation of the adjacent mechanism. The registering mechanism of the lowermost order is equipped only with a stationary transmission gearing, because there is no registering mechanism of lower order carrying values thereto. In addition to the registering mechanisms provided for performing normal calculations additional mechanisms are provided which are equipped with carrying means which however are not provided with means for transmitting values from the setting mechanism. In such mechanisms the gear wheel corresponding to the wheels 11 or 12 is locked. The mechanism of the highest order can not carry values to another mechanism. Therefore, in this mechanism the controlling means may be dispensed with.

By reason of the construction of the controlling mechanism described with reference to Figs. 27 to 34 and 84 and 85 the carrying operation requires little power, even if it is simultaneously performed in many mechanisms. As has been described with reference to the said figures, by the portions 131$^c$ and 131$^d$ of the cam 131$^1$ the member 126 is rocked outwardly, and the cam face 137, 138, 139, or 140 located at the rear of the said portion is firmly pressed against the cam 131¹, so that the movement of the cam is assisted by friction. This function may be made more effective in the manner shown in Figs. 89 and 90 by providing the cam 731 with a slight depression 775 engaged by a nose 737 of the member 726, so that the said member is directly carried along by the cam. When turning the cam in the direction indicated by the arrow $b^7$ pressures indicated by arrows $c^7$ are exerted on the member 726 which cause movements indicated by the arrows $d^7$. Therefore the upward movement of the lever 756 is caused not only through the upper arm of the member 726, but also by the pressure acting on the nose 737, the pressure on the nose 737 being particularly effective if the resistance opposed to the upward movement is high.

In Figs. 91 and 92 I have shown a modification in which the notch 875 is formed in a member 776 taking part in the movement of the cam 831, the lever 856 carrying a member 877 having a tongue 837 in position for engagement with the notch 875. Thereby I am enabled to provide the parts in the positions which are the most favorable for the transmission of the movement. In both cases the holes 762 and 862 must be elongated sufficiently to permit the noses 737 and 837 to pass into and out of the notches 775 and 875 respectively.

In the modification shown in Figs. 93 and 94 the transmission of the controlling movement is made more easy by directly transmitting the movement of the lever 956 to the gear wheel 917 of the next order controlled by the cam 931 if the numeral wheel is in the position between "9" and "0". For this purpose a tongue 978 is rigidly secured to the lever 956, which tongue is bent sidewise into position for engagement with the adjacent gear wheel 917, and which is formed with a notch 979 engaging a tooth 980 formed in the hub of the gear wheel 917. In case of high resistance, that is in case of a carrying operation being simultaneously performed in a plurality of registering mechanisms, the said notch 979 is firmly pressed to the tooth 980 when the arms 977 of the levers 956 are pressed with their noses 937 into the notches 975, so that rotary movement is directly transmitted to the gear wheel of the following registering mechanism. If, however, in the said registering mechanism the numeral wheel is not in the position intermediate the "0" and the "9", the tooth is in a position in which it is out of engagement with the tongue 978.

In Fig. 94 the parts which are similar in construction to corresponding parts described above have received similar reference characters, so that it is not necessary to repeat the description of such parts. In said figure I have illustrated the cooperation of several registering mechanisms of different orders. The registering mechanisms of the four lowermost orders are in corresponding positions and between "0" and "9", as is shown at the bottom part of Fig. 93, and it is desired that the lowermost cam 931 causes a carrying operation through several mechanisms. By the high resistance connected with this operation all the levers 956 are firmly pressed in the direction of the arrows $h$. Therefore the noses 937 engage in the notches 975 and the tongues 979 in the single teeth 980. Thereby all the gear wheels 917 are directly coupled with one another, and they are simultaneously turned by the carrying operation performed in the lowermost order. Therefore the transmission of power is not performed through adjacent gear wheels, but the whole series of gear wheels 917 moves in unison until the carrying operation is completed and the resistance is removed, whereupon the nose 937 and the tongue 979 disengage respectively the notch 975 and the single tooth 980 and the gear wheels are free to rotate independently of one another. In the uppermost order shown in Fig. 94 the cam 931 is in the reverse position, and the corresponding numeral wheel is between the "4" and "5" positions. The preceding gear wheel 917 is not coupled, because the single tooth 980 is at the opposite side, and the registering mechanism of the highest order is perfectly free, because the cam 931 is forwardly directed and when rotated presses the lever 956 rearwardly. Therefore, up to the order preceding the last one all the gear wheel 917 are coupled, and the coupling engagement is so much the more rigid the higher the resistance is, and they turn in unison. Also in this construction the nose may be provided on the tongue and the notch on the gear wheel 917. I wish it to be understood that the means for directly connecting the operating members such as the parts 979 and 980 are provided in all the mechanisms described above. For example, in the construction shown in Figs. 73 and 86 the tongues 978 are secured to the members 663.

In Figs. 24, 46, 64, and 79 I have shown means for compensating inaccuracies in the carrying operation, and it will be understood that such means will be provided in all the constructions described herein. As shown such means consist of locking members 81 adapted for locking engagement with the gear wheels 117 operating the controlling cams or with a wheel connected therewith. This locking operation must be successively performed in the different orders, and at first in the lowermost one and at last in the highest order, in order to make sure that the correction is made after the carrying operation has been performed. This adjustment which proceeds from the lowermost to the highest order is distinguished from the known adjustment of the numeral wheels, by being operative only for adjusting the mechanism controlling the carrying operation.

In Figs. 95 to 97 I have shown several examples of adjusting means, the object of the said means being to set the gear wheel (117 in Fig. 24 or 617 in Fig. 94) and the cam in correct positions. Any suitable means may be provided for this purpose, such for example as a notched lever 181 adapted to engage a tooth (Fig. 24) or a wedge shaped lever 281 adapted for engagement with a pair of adjacent teeth, as is shown in Fig. 46.

In Fig. 95 I have shown a wedge shaped rocker 81 engaging between adjacent teeth of the gear wheel 17 and adapted to be operated by cams 82 secured to a shaft 83, which cams are displaced with relation to each other in the registering mechanisms of the successive orders so that when turning the cams to the right in Fig. 95 at first the rocker 81 of the units is operated and thereafter that corresponding to the tens, the hundreds, etc., which cams have been indicated in Fig. 95 by the characters I, II, III, etc. When turning shaft 83 backwardly and into initial position all the cams are retracted by means of arms 84 of the rockers being engaged by the cams.

In Fig. 96 I have shown a modification which is understood to be provided in the construction described with reference to Figs. 71 to 86. As shown springs 685 are secured to the rockers 681, and when throwing the cams 682 into operation at first the springs 685 are engaged by the cams 682, so that the rockers are rocked elastically and with gradually increasing force, until the springs make contact at their free ends with the rockers and positively hold the same in position. Also in this case the elastic and light operation and the positive one are successively performed from the units to the registering mechanism of the highest order, so that in the registering mechanisms of the higher orders the rockers are rocked later and with smaller force than in the mechanisms of lower order, so that the mechanisms of higher order may be adjusted before being locked.

Fig. 97 shows the cams 682 located one beside the other. The figure also shows that the said cams are successively displaced with relation to each other, beginning from the units I and passing over to the tens II, the hundreds III, etc., which displacement has been shown in Figs. 95 and 96 in dotted lines.

The rockers 81 and 681 may be operated by any preferred means. To show what may be done an arm 683' is secured to the shaft 683 for operation of the rockers by hand.

The adjustment of the operating mechanism need not be performed after each calculation, as is necessary in carrying mechanisms now in use, but it is sufficient to do so after a large number of calculations, because the carrying operation is always necessarily performed and can not be omitted by accident. As a matter of fact the adjustment is merely a subsidiary operation and not a main operation. Therefore, in adding machines the adjustment need not be made before the end of the calculation and before reading or printing the result, and in multiplication machines it is made after performing a complete multiplication in all the registering mechanisms, or when reading or printing the final result after making several complete multiplications. As the adjustment is made only once at the end of partial calculations or at the end of a complete calculation, a speedy operation is insured.

While in describing the invention reference has been made to particular examples embodying the same, I wish it to be understood that my invention is not limited to the constructions shown in the drawings, and that various changes may be made in the general arrangement of the apparatus and the construction of its parts without departing from the invention.

I claim:

1. In a calculating machine, the combination, with the registering mechanism comprising a registering member, a driving member, and gearing adapted to connect and disconnect said driving and registering member, of means for bodily moving said gearing when in connecting position for transmitting carrying movement to the registering member and for returning the same when in disconnecting position.

2. In a calculating machine, the combination, with registering mechanisms of lower and higher order, the registering mechanism of higher order comprising a registering member, a driving member adapted to transmit values from 0 to 9 to said registering member, and two gearings intermediate said driving and registering member, of means for alternately setting said gearings into and out of position for connecting the driving and registering members, and means operated by the registering mechanism of lower order when its registering member passes between "9" and "0" for imparting carrying movement to one of said gearings of higher order.

3. In a calculating machine, the combination, with the registering mechanism comprising a registering member, a driving member, and two gears adapted alternately to connect and disconnect said driving and registering members, of means for bodily moving one of said gears when in connecting position for transmitting carrying movement to the registering member and for returning the same when in disconnecting position.

4. In a calculating machine, the combination, with the registering mechanism comprising a registering member, a driving member, and two gears disposed within the same plane and adapted alternately to connect and disconnect said driving and registering members, of means for operating one of said gears when in connecting position for transmitting carrying movement to the registering member and for returning the same when in disconnecting position.

5. In a calculating machine, the combination, with the registering mechanism comprising a registering member, a driving member, and two trains of gears disposed within the same plane and arranged along a hexagon and adapted alternately to connect and disconnect said driving and registering members, of means for operating one of said gears when in connecting position for transmitting carrying movement to the registering member and for returning the same when in disconnecting position.

6. In a calculating machine, the combination, with a registering mechanism of lower order, and a registering mechanism of higher order comprising a registering member, a driving member adapted to transmit values from 0 to 9 to the registering member, and two trains of gear wheels intermediate said driving and registering members, of means controlled by the registering mechanism of lower order to set said trains alternately in connecting and disconnecting positions and to bodily move one of the gear wheels of one of said trains when in connecting position for imparting carrying movement to said registering member and to return said bodily moved gear wheel into initial position when in disconnecting position.

7. In a calculating machine, the combination, with a registering mechanism of lower order, and a registering mechanism of higher order comprising a registering member, a driving member adapted to transmit values from 0 to 9 to the registering member, and two trains of gear wheels intermediate said driving and registering mechanism of higher order, means controlled by the registering mechanism of lower order to set said trains alternately in connecting and disconnecting positions and to bodily move two meshing gear wheels of one of said trains when in connecting position for imparting carrying movement to said registering member and to return said bodily moved gear wheels into initial position when in disconnecting position.

8. In a calculating machine, the combination, with registering mechanisms of lower and higher order, the registering mechanism of higher order comprising a registering member, a driving member adapted to transmit values from 0 to 9 to said registering member, and two gearings intermediate said driving and registering member, of means for alternately setting said gearings into and out of position for connecting the driving and registering members and for temporarily and simultaneously setting both gearings in connecting positions, and means operated by the registering mechanism of lower order to impart carrying movement to one of said gearings of higher order.

9. In a calculating machine, the combination, with registering mechanism of lower order, and a registering mechanism of higher order comprising a registering member, a driving member adapted to transmit values from 1 to 9 to said registering member, and a train of gear wheels intermediate said driving and registering member comprising two gear wheels having fixed axes and a gear wheel adapted to be rocked into and out of mesh with one said gear wheels having fixed axes and about the other one of the fixed axes, said gear wheels being disposed relatively to one another so that in the meshing position of the rockable gear wheel the common tangent of the rockable gear wheel and the gear wheel adapted for connection and disconnection therewith is substantially tangential to the gear wheel about the axis of which the rockable gear wheel rocks, and said rockable gear wheel being bodily movable circumferentially of the gear wheel connecting the same with said registering member for transmitting carrying movement thereto, of means controlled by said registering mechanism of lower order for throwing said rockable gear wheel into and out of mesh and for circumferentially shifting the same and back again respectively in its meshing and out-of-mesh positions.

10. A train of gear wheels comprising two gear wheels having relatively fixed axes and a gear wheel bodily rockable about one of said axes and into and out of mesh with the gear wheel rotatable about the other one of said axes, and said rockable gear wheel being bodily movable circumferentially of the gear wheel connecting the same with said registering member for transmitting carrying movement thereto, of means controlled by said registering mechanism of lower order for throwing said rockable gear wheel into and out of mesh and for circumferentially shifting the same and back again respectively in its meshing and out-of-mesh positions.

11. In a calculating machine, the combination, with registering mechanisms of higher and lower orders, the registering mechanism of higher order comprising a driving member, a driven member, and two gearings intermediate said driving and driven members, of a cam mechanism controlled by said registering mechanism of lower order and formed with cam faces cooperating with said gearings and adapted alternately to set the same into positions for connecting and disconnecting said driving and driven members and to operate one of said gearings when in connecting position for transmitting carrying movement to said driven member.

12. In a calculating machine, the combination, with registering mechanisms of higher and lower orders, the registering mechanism of higher order comprising a driving member, a driven member, and two gearings intermediate said driving and driven members, of a cam mechanism controlled by said registering mechanism of lower order and formed with cam faces cooperating with said gearings and adapted alternately to set the same into positions for connecting and disconnecting said driving and driven members and to operate one of said gearings when in connecting position for transmitting carrying movement to said driven member, the cam faces controlling the setting movements being of such relative lengths that both gearings are temporarily and simultaneously in connecting positions.

13. In a calculating machine, the combination, with registering mechanisms of higher and lower orders, of carrying mechanism comprising a cam member having its cam face formed so as to impart gradually accelerated carrying movement.

14. In a calculating machine, the combination, with registering mechanisms of higher and lower orders, of carrying mechanism comprising a cam member having two concentric cam faces of different radii and faces intermediate said concentric faces and merging substantially tangentially into the cam face of smaller radius and shaped so as to impart gradually accelerated carrying movement.

15. In a calculating machine, the combination, with the registering mechanisms, and carrying mechanisms therefor comprising operating members controlled each by the registering mechanism of lower order, of means operative when successive registering mechanisms are in positions for transmitting carrying movements for directly coupling said members with the registering mechanisms of the next higher orders.

16. In a calculating machine, the combination, with registering mechanisms of higher and lower order, the registering mechanism of higher order comprising a driving member and a driven member, and gearing intermediate said driving and driven members, of means to transmit values from 1 to 9 to said driving member, a member controlled by the registering mechanism of lower order for transmitting carrying movement to the registering mechanism of higher order, and guiding means cooperating with the transmitting member for insuring exact carrying operation.

17. In a calculating machine, the combination, with registering mechanisms of higher and lower order, the registering mechanism of higher order comprising a driving member and a driven member, and two gearings intermediate said driving and driven members, of means to set said gearings alternately in positions for connecting and disconnecting said driving and driven members, means to transmit values from 1 to 9 to said driving member, a member controlled by the registering mechanism of lower order for transmitting carrying movement through one of said gearings when in connecting position to the registering mechanism of higher order, and guiding means cooperating with the transmitting member for insuring exact carrying operation.

18. In a calculating machine, the combination, with registering mechanisms of higher and lower order, the registering mechanism of higher order comprising a driving member and a driven member, and two gearings intermediate said driving and driven members, of two members controlled by the registering mechanism of lower order and each adapted to set one of said gearings alternately into positions for connecting and disconnecting said driving and driven members, one of said members being adapted to impart carrying movement to the gearing operated thereby, and guiding devices on said members cooperating to insure correct carrying operation.

19. In a calculating machine, the combination, with registering mechanisms of higher order comprising a driving member and a driven member, and gearing intermediate said driving and driven members, of means to transmit values from 1 to 9 to said driving member, a rocker, a frame member rockingly mounted on said rocker and carrying said gearing and formed with four cam faces, and a cam operated by the registering mechanism of lower order and engaging said cam faces for setting the member with the gearing into positions for connecting and disconnecting said driving and driven members and for imparting carrying movement to the driven member.

20. In a calculating machine, the combination, with the registering mechanisms, and the carrying mechanisms, of means operative after the registering operation for adjusting the mechanisms in positions.

21. In a calculating machine, the combination, with the registering mechanisms, and the carrying mechanisms, of means operative after the registering operation for adjusting the mechanisms in positions, said means being successively operative beginning from a registering mechanism of lower order and continuing through registering mechanisms of higher order.

22. In a calculating machine, the combination, with the registering mechanisms, and the carrying mechanisms, of means operative after the registering operation and including a spring and a positive stop therefor for adjusting the mechanisms in positions.

23. In a calculating machine, the combination, with the registering mechanisms, and the carrying mechanisms, of rockers adapted for adjusting engagement with said registering mechanisms, and operating members mounted on a common rock shaft and disposed relatively to the rockers so as to successively throw the same into adjusting positions.

In testimony whereof I hereunto affix my signature in the presence of two witnesses.

HERMANN BUSCHBAUM.

Witnesses:
FRANCIS J. DUGAN,
AUGUST QUICK.